(12) United States Patent
Calaway

(10) Patent No.: US 7,092,116 B2
(45) Date of Patent: Aug. 15, 2006

(54) METHOD AND SYSTEM FOR PROCESSING AN ANNOTATED DIGITAL PHOTOGRAPH USING A COMPOSITE IMAGE

(76) Inventor: Douglas Calaway, 5815 Guenevera Ct., St. Cloud, FL (US) 34772

( * ) Notice: Subject to any disclaimer, the term of this patent is extended or adjusted under 35 U.S.C. 154(b) by 596 days.

(21) Appl. No.: 09/896,653

(22) Filed: Jun. 29, 2001

(65) Prior Publication Data

US 2002/0012134 A1 Jan. 31, 2002

Related U.S. Application Data

(60) Provisional application No. 60/215,382, filed on Jun. 29, 2000.

(51) Int. Cl.
*G06F 13/00* (2006.01)

(52) U.S. Cl. .................. 358/1.18; 358/538; 358/540
(58) Field of Classification Search .............. 358/1.13, 358/487, 527, 296, 302, 305, 1.1, 1.9, 1.18, 358/538, 540; 355/502, 40; 396/429, 310, 396/311, 315; 705/26; 709/218
See application file for complete search history.

(56) References Cited

U.S. PATENT DOCUMENTS

| | | | |
|---|---|---|---|
| 5,196,859 A * | 3/1993 | Tomiyama | 346/74.5 |
| 6,157,436 A | 12/2000 | Cok | 355/40 |
| 6,321,231 B1 | 11/2001 | Jebens et al. | |
| 6,332,146 B1 | 12/2001 | Jebens et al. | |
| 6,483,570 B1 * | 11/2002 | Slater et al. | 355/40 |
| 6,583,799 B1 | 6/2003 | Manolis et al. | |
| 6,583,852 B1 | 6/2003 | Baum et al. | |
| 6,587,596 B1 | 7/2003 | Haeberli | |
| 6,646,754 B1 * | 11/2003 | Redd et al. | 358/1.13 |
| 6,657,702 B1 * | 12/2003 | Chui et al. | 355/40 |
| 6,704,712 B1 | 3/2004 | Bleiweiss | |

\* cited by examiner

*Primary Examiner*—Twyler M. Lamb
*Assistant Examiner*—Alan Rahimi
(74) *Attorney, Agent, or Firm*—Morris, Manning & Martin LLP

(57) ABSTRACT

An annotated digital photograph processing system that forms a plurality of composite image files from a plurality of corresponding digital images, annotation information and process control information, and prints them as a plurality of composite images on a roll of photographic medium. Each composite image file may be generated by a server computer, which also receives the components thereof, the file comprising the image and a first symbol. The first symbol includes process control information, and may optionally include annotation information. A roll containing the composite images is processed by a novel printing apparatus that comprises a scanner and inkjet print-heads connected to a control computer, to print the annotation and a second symbol, which includes process control information, directly behind the image to which they correspond after the destructive effects of photo-processing chemicals occur. Then, the first barcode is severed from the medium for each printed image.

44 Claims, 12 Drawing Sheets

METHOD AND SYSTEM FOR PROCESSING AN ANNOTATED DIGITAL PHOTOGRAPH USING A COMPOSITE IMAGE

CROSS REFERENCE TO RELATED APPLICATION

This application claims the benefit under 35 U.S.C. 119(e) to U.S. Provisional Patent application No. 60/215,382 entitled "Annotated Digital Photograph Processing System" filed Jun. 29, 2000, naming Douglas Calaway as inventor.

TECHNICAL FIELD

This invention pertains to a system for printing electronic images, and more particularly to a system for electronically ordering prints of electronic images and associated annotations and overlays to be printed in connection with the images.

BACKGROUND OF THE INVENTION

The field of photography has many participants. These range from professional photographers, to hobbyists, to family members taking pictures of their loved ones on special occasions. The photography industry is also a relatively mature one, photography having been developed about 150 years ago.

The quality of photography equipment has improved dramatically since the early years. There have been improvements in lens making and in camera mechanics, and there have been many technological improvements in film processing and printing, most notably the development of color photography. However, the technology of exposing film and paper to a light image and chemically developing the film and paper, used since the early days, has remained virtually unchanged over the years. Furthermore, the widespread proliferation of electronics have allowed photography novices to more easily take high quality pictures by reducing the occurrences of photographs out of focus and over or under exposed.

Film must still be developed by a chemical process in a darkroom and photographic paper must be exposed with an enlarger and then developed with another chemical process. These processes are relatively tedious and require relatively expensive equipment and meticulous skill to produce images of acceptable quality. Consequently, only the most advanced professionals posses the equipment and skills necessary to develop their own photographs. The vast majority of photographers must still take their exposed rolls of film to a commercial processor to be developed. Doing so is inconvenient and more than a week may elapse before the developed images are ready for pick up by the customer at the commercial processor's place of business.

As mentioned above, the insurgence of electronics into just about every aspect of life has improved the quality of photography for many people. A recent development that has had a profound impact on photography has been the digitizing of images. Digital images, along with the Internet, are revolutionizing the way media is delivered to people and the way people communicate, among other things. Digital images are created and obtained from a variety of sources. Some of the more common sources include digital cameras, the scanning of an image contained on paper and the capturing of images from a video signal. These images can be easily sent to a recipient far, far away from the sender via the internet.

A digital camera works like a traditional camera, in that it has a lens and a shutter. However, instead of film as in a traditional camera, it has a solid state image sensor, called a charge coupled device ("CCD"), that converts the light incident upon it into an electrical signal, which is then converted into a digital representation of the electrical signal. The digital representation can then be stored in various formats on various types of storage media. This allows the image to be easily transferred from the camera to a variety of other devices, such as a computer. When the image has been transferred to a computer, for example, it can be sent to another computer via the internet for viewing by someone else. This aspect provides many benefits. For instance, a parent can take a picture of a child, for instance, and then immediately store the image to a computer and send it, via the internet, to a grandparent living many miles away.

Another method of acquiring digital images is scanning an existing image contained on paper. This method uses a scanner, which also incorporates a light sensitive transducer for converting light into an electrical signal. Facsimile ("FAX") machines, wherein the scanner technology has been employed for more than a decade, and the more recently derived flatbed scanners produce light that is reflected off the image to be scanned and onto the transducer. The resulting digital signal can then be transmitted over telephone lines from one fax machine to another, or from a flatbed scanner to a computer for transmitting over the internet as described above. Thus, there are multiple methods available for acquiring a digital image represented by an electronic signal.

Although multiple methods for acquiring a digital image exist, it is still often desirable to have an image on traditional media such a paper. This can be easily accomplished with computer printers commonly available, but the image quality from these printers is not as high as the quality of traditional developing on photographic paper. There are some printers that use thermal wax to render images on paper. These printers produce images of higher quality than the less expensive printers do, but the cost to the customer is high. Another problem with printing an image using a computer printer is due to the phenomenon that occurs when an image is displayed on a computer monitor. Tiny amounts of phosphor material are activated and add together to render the viewable image on the screen using a Red-Green-Blue color scheme ("RGB"). This generally results in a fairly accurate rendering of the image with respect to color, because many computer monitors are capable of rendering an image having a high gamma. However, when images are printed with a computer printer, the rendered image may not be accurate due to the generally low gamma capabilities of many computer printers. This creates a difference between how an image appears when viewing the image on a screen and how it appears when printed on paper. What one sees on the screen may not be actually what one gets on the paper. Furthermore, a computer printer only prints on one side of a medium, but a customer may want to annotate an image on the reverse with information such as the date the image was captured or a brief description of the image contents.

Devices exist that will project a digital image onto photographic paper and utilize the traditional method of treating the paper with chemicals in a dark environment to produce a viewable image paper. The result is a high quality image having a high gamma that differs in quality from a traditional photograph only to the extent of the limitations of the camera and CCD devices. Thus, an improvement over printing with a computer printer results. However, the image, whether digitized or on traditional film, must be delivered to a commercial establishment for printing on the photographic paper because the cost of the equipment and skill necessary to produce an image on photographic paper in the manner described above is beyond the means of the typical consumer.

Some systems that employ these devices use computer processors to manage the production of images on photographic paper and other media. For instance, U.S. Pat. No. 6,157,436 relates to "[a]n image printing system for generating multiple printed image copies in response to an order. A processor can divide the order into multiple sub-orders for respective image printers, each sub-order having a sub-order header which includes a unique order identification and an indication of the number of copies of the image to be printed by the corresponding printer."

However, the existing references in the area do not address the printing of information on the image reverse such that the printed matter is not affected by processing chemicals. Although it is common in the art to place a time and/or date stamp on an image reverse, this is typically done before an image is exposed on the photographic paper. Thus, the ink is affected by the processing chemicals such that the resulting printed information appears as a faint blue or pink color that may be hard to read. In addition, the printing machines currently used in the art do not associated specific information with a particular image.

Therefore, there is a need in the art for a cost-effective method and system for printing a digital image on a high quality medium that overcomes the inconvenience of delivering and retrieving digitally encoded images between an establishment that specializes in printing such images and the customer who desires the images.

Furthermore, there is a need for the method and system to facilitate printing an annotation on the reverse of an image so that the printed annotation is not affected by the chemical developing process used with photographic paper media. Moreover, the annotation should be capable of containing information that is particular to the image to be printed, rather than merely containing the time at which the image was printed.

Finally, there is a need for the method and system to facilitate assembling an order of printed images.

SUMMARY OF THE INVENTION

The present invention meets the needs described above with a method and system for online ordering and printing of digital images. The invention includes the hardware and software required for creating and implementing such a system. The method and system use the Internet to connect a customer who wants digital images developed to a facility where printing equipment is installed. Thus, the necessity of a customer manually transporting a roll of film or digitized images stored on a device such as a floppy disk to a particular photo-shop physical location for high quality printing of the image is eliminated.

In addition, the method and system includes software to allow the customer to order images that reside on the customer's computer hard drive. For instance, if the customer has a collection of images stored to a particular drive of his or her computer, the system software associates the selected images as the customer selects them for printing, and adds the selected image files to the customer's shopping cart. Such a process of storing items to a shopping cart is know in the art of electronic commerce over the Internet.

After the image files to be ordered have been added to the shopping cart, and the customer submits the order, the image files are associated with order information generated by the photo-shop computer and stored thereto for future. However, the customer may still wish to deliver the actual image files to a photofinisher rather than download the image files directly to the photoshop computer server. This is especially important if the customer's Internet connection is slow. Thus, if the customer has a file writing device that writes computer files to a removable read/write media, such as a floppy disc, a compact disc or a ZIP® disk, a registered trademark for a device manufactured by Iomega Corporation, the system software will cause the writing device to record the image files and order identification information to the removable media. Then, the customer may deliver the media to the photo-shop for printing of the images.

When the media has been delivered, the photo-shop uses the order identification information, which was stored to the photo-shop computer at the time of submitting the order of selected images in the shopping cart, to process the printing and assembling of the ordered images into an order to be delivered to the customer.

The system and method also include hardware and software necessary to assemble an order of images and ship them to a predetermined location. Consequently, the requirement that the customer retrace his or her steps to later pick up the printed images is also eliminated.

The system also includes sufficient equipment for producing images printed on various sizes of print media. This allows quick printing of ordered images, even order combinations that are complex with respect to image quantity and size. Therefore, instead of ordering and having to pay for every image on a roll of film, the customer can select the size, quantity and which images to pay for all from the comfort of his or her home or office.

In addition to facilitating the ordering of high quality images printed from a digitally stored image, the system also allows a customer to specify an annotation to be printed on an image reverse. This produces a neat, professional looking annotation that can be easily read, as opposed to a handwritten caption, which often will be written by someone with poor penmanship. Furthermore, the annotation may be printed in a variety of colors, fonts, or other symbols or features that are available using standard computer printers known in the art. Examples are ink jet printers or laser printers. Moreover, since the annotation will typically be submitted soon after the picture is taken, there is less likelihood that the information will be forgotten or inaccurately annotated.

A related feature of the present invention is to extract information that may be encoded into the digital image file and printing such information as the annotation. The present invention is also designed to provide for a message to be merged into the image to be printed on the image front as part of the image itself.

Since the images may be submitted and the prints thereof ordered online, it only makes sense that the customer will not have to physically pick up the prints at the printer's place of business. Therefore, to further provide convenience in having prints made of images, the printed images may be delivered to the customer's residence or any other place he or she designates. The delivery may be made in accordance with delivery instructions the customer specifies. The delivery instructions include a preferred method of delivery, the delivery address and a specified billing method.

Furthermore, the benefits of the invention are not just limited to individual consumers. Retail photo developing outlets, such as the establishments located in shopping malls, may also take advantage of the invention to run their business more efficiently. Some consumers still do not have connections to the Internet and some are still reluctant to participate in commerce over the Internet due to lack of training or suspicions over submitting personal information over the Internet. Thus, even if customers use a digital camera for taking pictures, they still may take the digital images to a photofinisher for developing on photographic paper. However, many of these retail establishments do not have on site developing equipment, so they farm the work out to laboratories that do have such equipment. By using the Internet to submit the digital images for printing, and having the printed images delivered back to the retailer, the retail photofinisher can provide speedier and more efficient service to the consumer.

The invention also provides for limited access to the system images through the use of an identifier system. As with most e-commerce business methods, the invention requires the use of a user identifier and an account identifier to access the image database and personal information stored in the information database. The present invention also allows more than one individual to have access to the same account. The user identifier identifies a particular individual who has access to the account and allows access to that individuals images that may be stored with the photofinisher on the database. The account identifier provides access to the account. The account identifier will also provide access to certain premium features associated with the account, such as the video capture feature discussed in more detail below, which may require a fee above the retailer's standard access plan. A second account identifier allows access, but only limited access, to the databases in the upload or download modes.

The system provides a user interface for accessing the system, submitting images and entering processing information. A browser for accessing the Internet provides a convenient environment for such an interface. If a customer has Internet access, either at home or at an office, the system can be accessed through an Internet browser. By entering the proper Uniform Resource Locator ("URL"), the customer accesses a photofinisher's web site and can begin the ordering process.

The ordering process begins with the system presenting a dialog box for the user to enter certain access credentials. Most commonly, this will be a username and a password, both identifiers comprising a combination of characters so that the identifiers are unique to the user and to the account being accessed. These credentials are collectively referred to as the customer identification ("CID"). By entering into the dialog box the CID that correspond to an existing account registered with the photofinisher, the user gains access to the web site.

The preferred embodiment of the invention prints digital images received from the Internet using traditional photo finishing techniques and then delivers the printed images to a specified delivery address. The invention may use personal computers and associated peripherals that are connected by the Internet. These peripherals include digital cameras and scanners for producing digital images. Other peripherals include printers, scanners and sorters connected to the production computer. In addition to the hardware, software allows a customer to interface with the system, enabling the customer to submit images, determine what images will be printed and specify where the printed images are to be delivered among other things.

The most common source of digital images submitted to the system will probably be a camera. Digital cameras are becoming increasingly prevalent as the quality of the images improves and the prices fall due to competition. Therefore, more and more consumers are using digital cameras to document the significant events in their lives. However, there are still many traditional cameras in use. A photograph obtained from a traditional camera and film arrangement may be scanned and converted into a digital image in order to transmit the image over the Internet or display it on a computer screen.

Another source for images is provided by a feature that accesses video programs and captures images therefrom. These video programs may be from either live broadcasts or previously recorded material. The business owner may contract with certain entities to allow the showing of copyrighted material. This will provide another channel of business for an owner of video material, as well as provide increased awareness of and revenue from a photofinisher's services.

Image capture involves viewing a video program and selecting a specified frame from the video to be saved as a still image. A variety of sources of the video exist. These include a live broadcast, an electronically stored video possessed by a user on a storage medium or a video offered by the operator of the photofinishing web site, which can be viewed for performing image capture thereon. Thus, while viewing a video program, a user may select a frame by executing a command associated with a control item, thereby freezing the frame and making it available for saving on a storage medium.

A user may possess software for performing this function, or the system may provide this feature through the user interface. The functionality provided by the system through the user interface can capture images from a video program submitted to the system or on a video program already residing on a storage medium connected to the system. Videos being offered by an operator of a photofinishing web site may be provided as part as an entertainment product and access to such programming may be restricted though the use of an electronic key as described above.

As an example, the photofinisher can enter an agreement with the National Football League and stream a video signal comprising a live broadcast of a football game. A fan can view the broadcast game and when a particularly memorable play occurred, the viewer can access the image capture feature of the invention and memorialize the event into a still image. This will be particularly desirable when a favorite player scores a touchdown or makes an extraordinary catch, or even to memorialize the inevitable erroneous judgments made by referees. The photofinisher can also provide archived video clips of sporting events, movies, or noteworthy historical events, to name just a few examples of the wide variety of programming that can be made available.

Optionally, additional CIDs may be entered into a dialog box using a browser to provide access to other sources of images. An additional CID provides a way to achieve multiple levels of access to the system, thereby expanding the number of products and services a photofinisher can make available. For example, a professional photographer may take pictures at a wedding. The happy couple may want to examine the pictures before selecting which images and what quantity of the selected images to order. The photographer will provide to the couple a CID to access the database and view the images, but the couple will not be able to order the images without a second CID. The couple will also not be able to enlarge the thumbnail images while viewing the images using the customer interface without possessing and entering the second CID. If this were not the case, the couple could enlarge a thumbnail, download the image without paying and then submit the image to another photofinisher for printing, thereby bypassing the photographer's fee. The photographer might have a predetermined fee for purchasing access to the second CID, which can provide unlimited access to the database and order interface. Alternatively, the second CID might only allow ordering of predetermined packages, a package, for example, having a certain combination of image quantities and sizes. Thus, the second CID provides a way to mimic how a photographer traditionally conducts business following such an event. Instead of having to print and deliver to a customer a proof sheet containing all the images from which to select images for processing, the photofinisher merely allows the couple to view the images through the browser. The second CID can also direct that part of the fee billed to an individual's account be directed to the photographer, and that part be directed to the photofinisher.

Once an image is in an electronic format, regardless of the originating source, the image can be easily transmitted to a production facility via the Internet. An Internet browser is provides means for submitting images to be stored into the archive database to be selected later for printing. In addition, an image may also be submitted as an e-mail attachment or through the U.S. Mail system. In either case, the user name and account number or password will be submitted along with the image so that the photofinishing facility will be able to associate the image with the user's account.

When an image is submitted using the interface or an e-mail attachment, the image will initially be stored on the user's computer storage medium and uploaded via the internet by sending a command directing the image to be transferred to the address associated with the interface URL. After the system has been accessed and an image or images have been submitted, the user interface displays the images that are available for printing. These images are displayed in a designated region of the interface as thumbnail images, which allow viewing of multiple images at once. An image may be selected by using a pointing device such as a mouse, light pen, or stylus. When an image has been selected, it is displayed as a singular image in a designated region of the interface.

In addition to facilitating submission of images to be printed, the present invention provides a method for annotating an image that has been submitted for printing. Placing a written message on or near a photographic image is a practice commonly performed to memorialize certain information associated with the image. Many times, parents will manually write on the back of a photograph the date or location the photograph was taken. Perhaps even a quotation of what the subject of the photograph said when the photograph was taken may be inscribed on an image. The interface generated by the photofinisher's web site provides a means for submitting an annotation. Alternately, the annotation may be attached and submitted along with the image if submitted via e-mail or the U.S. Mail for example. Thus, a customer may annotate the image reverse with information such as the time, place and subject matter contained in the image. When the annotation information is received, the system stores it to a database and indexes it to the associated image by using a unique image number that is generated when the image is received.

The Internet browser interface will typically contain a dialog box with a command item, such as a text entry box, for entering the annotation text. However, the command item of the interface may also provide an option for linking to a database entry or a computer object, the object containing text, a symbol or even another image. This can be useful to a law enforcement agency, for example, by allowing a photograph obtained from a crime scene to be linked to a stored computer object comprising a scanned image of the corresponding police report. Alternatively, a news reporter conducting a live interview or report may be able to quickly annotate or link a still image to a note stored on a computer. The previous two examples can be refined further if the photographers in the field were using digital cameras and were accompanied by portable computers at the site location. The images can be immediately linked to or encoded with an annotation before uploading the image and the annotation for printing. For obvious confidentiality concerns in the examples discussed above, the law enforcement agency or the news service can operate their own proprietary versions of the invention to minimize the potential for exposure to third parties.

Instead of an annotation being submitted by executing a command item presented by the user interface, annotation information may also be extracted automatically from an electronic image file. A typical digital camera provides the option of including a date and time stamp as part of the image. The present invention may take advantage of this fact by sensing the presence of such information, extracting the information, and printing it on the image reverse. If the image and the accompanying embedded information are stored in a standard format, the invention can detect the presence of such information while translating the electronically stored image into an electronic signal. This is a very handy feature because the information most typically desired on the back of a photograph is that which is necessary to document when the picture was taken.

Another feature of the invention allows a message to be overlaid over the image. Thus, the invention can create the appearance that an autograph has been signed on an image or provide a commercial slogan on the image. For example, a message can be overlaid across the front of a large, poster size section of print media in a selected font, to appear as though it had been autographed by an individual shown in the image. Alternatively, a chamber of commerce can have an image printed of a tourist attraction with a message printed across the front extolling the virtues of the attraction to entice patronage. The overlay can be a message entered or linked to in a manner similar to those in which the annotation was entered or linked as described above. The message of the overlay can be rendered in a font selected from a set of fonts. Furthermore, the font may be generated by sampling a handwriting example of a celebrity or other notable individual, thereby adding to the authentic appearance and impact of the autograph or signature. Location coordinates and an orientation angle of the overlay may be specified through the user interface.

After the images to be printed have been selected, the system provides a way to determine the makeup of the order, where to deliver the order and how to bill the order. A control item, typically a text bar, is used to allow a customer to enter a name and an address to which the order will be delivered. In addition, billing information, such as a credit card account number and expiration date may be added to facilitate expedited delivery. Other forms of payment may also be used such as a check or even cash. Alternately, a customer may establish an account with the photofinisher, so a credit card account number need not be transmitted over the internet and the delay associated with delivering cash or a check will be eliminated. When the account information is entered with the interface, the information is stored to a database. This information is associated with the username, password and electronic key if applicable. Associating the account information with the identifiers in this manner provides added convenience when placing an order in the future because the information will not have to be entered again. When a future order is placed, the default information already entered into the database will automatically be used, unless a control item such as a check box directs that a different address and account number will be used. The address and account information that are to supplant the default information are entered with the interface in the same manner using the same control items as was the information being supplanted. Once the image or images have been ordered and a delivery address and information of an account to be billed have been entered, the process of printing the images begins.

The printing process begins when an electronic image file is converted into a light image that is projected onto a photographic paper medium. The medium is supplied from a spool that feeds the media into the printing apparatus. The printing apparatus is a commercially available item known in the art that comprises means for exposing the paper, chemically processing the paper and advancing the processed paper onto another spool.

Depending upon the size ordered and the resources of the photofinisher, the apparatus configuration may vary. A high volume photofinisher may have a multiple apparatus arrangement, which uses separate apparatuses to handle different media sizes. Thus, if multiple images are ordered but not all images are specified to be of the same size for a given order, the multiple apparatus arrangement will allow the images from a single order to be produced simultaneously. If the photofinisher has restricted resources, or typically fills a relatively low order volume, only one apparatus for printing the images may be employed. This will require that images from multiple orders be printed that are of a specified size, and then a spool with another size of medium be loaded to accommodate the next size of images to be printed. Then, after a predetermined number of prints have been printed, the images will be sorted according to order number for delivery to a specified delivery address.

During the process of printing the images, certain novel steps are performed to implement the features of the invention. On a region of the medium immediately adjacent to the exposed image, a first symbol, which is preferably a barcode, is printed by exposing the barcode as a light signal on the medium to be developed by a chemical process along with the image or images. The first barcode spans across the image paper in a direction perpendicular to and in front of the image to be printed relative to the direction the media travels through the printing apparatus.

This first barcode is encoded with information that is to be used for other steps in the process. This information preferably comprises the annotation and process control information, which may include an order number, an image number and a customer number. However, the process control information may only comprise an order number and image number. As each image is photographically printed on the medium, an inkjet print-head prints cut-marks to indicate the boundaries of the first barcode so that it may be cropped to leave only the printed image with the annotation and second barcode on the reverse. After the cut-marks are printed on the medium reverse by the inkjet print-head, the printing device punches holes at the cut-marks so that a commercially available cutting apparatus, which is known in the art, may sever the medium to remove the first barcode from the medium.

After a spool of media has been exposed with a plurality of images and associated first barcodes, the media is collected on a take-up spool and the take-up spool is transported to a workstation containing an annotating apparatus.

The media on the take up spool is then fed into the annotating apparatus for further processing. As the media advances through the annotating apparatus, information in the first barcode is extracted with a scanner. Ink jet printheads print the annotation as well as a second barcode on the image reverse.

The second barcode contains the process control information extracted from the first, which may include an order number and a customer number. However, if the first barcode did not contain a customer number, a computer that is part of the annotation apparatus may access, via a network, a database that is indexed by order number and resides on the order computer, which is preferably the computer server to which the customer was connected when placing the order. This database associates the order number with a customer number and other customer information. This information includes name, address, telephone number, shipping address, billing address, billing account information, among other similar, relevant information.

Similarly, if the first barcode does not contain annotation information, but contains an image number, the computer attached to the annotation apparatus can access, via a network, the order computer. Thus, if the barcode does not contain annotation information, but an annotation was ordered, the annotation information may be transferred from the order data, which is associated with the image number and order on the order computer.

After all the ordered images and associated annotations and overlays for a given order have been printed, a proof sheet is printed for each size of print medium used. The proof sheets may contain a thumbnail for each ordered image and any associated annotation in close proximity to the associated image. The proof sheets will be printed as the last image for a given order on the each size of media being used for that order. Information encoded into the first barcode of the proof sheet may also contain information directing an automatic cutter not to perform the first cut so that the first barcode remains part of the proof sheet.

The media from the second take-up spool may be fed into a commercially available cutter known in the art. A transducer, preferably an LCD sensor, senses the holes or cutmarks indicating where to sever the media. The first barcode is severed from the medium at the first cut mark and the image is severed from the medium at the second cut mark where the next image region begins. This leaves a cropped image that is transported to a collection bin for further processing.

When the ordered images have been printed, including the proof sheet, a scanner reads the first barcode that remains on the proof sheet, and sorts all the remaining images according to order and customer number. Alternatively, the second barcode, which may include the process control information on the image reverse, may be read to facilitate order assembly. This may be useful when the first barcode has been severed from the proof sheet. When the process control information has been read from the proof sheet, the order and customer numbers are stored into an electronic computer memory. If no proof sheet exists, or is defective, the process control information from the first image read may be used to group all images having similar process control information. As each cropped image is processed by a sorting apparatus, process control information from the second barcode on the reverse of each image is also read into the memory. The process control information read from the second barcode is compared to the process control information read from the first barcode of the proof sheet or first image read. Thus, each image having identical process control information to that of the first-read image is segregated from the remaining images. This facilitates the collecting of all images having identical process control information to form a completed order.

Alternatively, the images may be sorted manually instead of automatically by sorting the printed images according to the order number contained in the second barcode that matches the order number from the associated proof sheet. Manual sorting and assembly is facilitated by including in the annotation printed on the reverse the order number printed in alphanumeric characters to facilitate manual sorting and assembly by photoshop personnel.

As the ordered images are collected, a label bearing the delivery address may be generated. When the completed order is arranged, the images are placed into a container such as a pouch made of a paper or woven fiber product. The label containing the delivery address is placed over a flap on the pouch, sealing the pouch and making it ready for delivery.

Delivery may be accomplished by a number of various methods. Regardless of the method of delivery, the delivery costs will be billed, along with the basic developing charges, to the customer's account associated with the identifier used to access the system prior to placing the order.

The above description of the invention has focused on the use of the Internet as a means of submitting an image and order instructions. However, an electronic image file or files stored in a standard format on a medium such as a removable computer disc may also be submitted in person at the photofinisher's place of business, without any Internet connection being used. If this were the case, the annotation information and other order information would have to be manually recorded and associated with the customer by personnel at the photo-shop. Similarly, the delivery of the images may comprise a customer receiving the ordered images in person at the photofinisher's place of business. Furthermore, the charges and payment thereof for developing and delivery, if applicable, can also be performed in person.

The typical image media will be photographic paper, but the image may be rendered on other types of media as well, including cups and mugs, tee shirts, caps and other merchandising items. The media can also include slides, transparencies, or other media used for presentation.

As mentioned above, the invention uses a novel annotation printing apparatus. The annotation printer is used for a variety of steps in the process of printing the digital images. These steps include scanning the first barcode; extracting the annotation and process control information from the first barcode, and printing the annotation and a second barcode on the image reverse.

The annotation apparatus workstation is basically a flat table having a rectangular top with various components attached thereto. The table has two spindles, one for receiving a medium spool and one for receiving a take-up spool. The spools are mounted to the table near the front edge, with each spool located approximately one third of the front edge distance from the corresponding outer edge. Near the rear edge, two capstans are located near each corner. The capstans regulate the speed at which the medium moves through the apparatus by maintaining a constant speed of medium travel. The drives for the spools are regulated through a clutched drive mechanism, know in the art, such that a slight tension is maintained on the medium as it travels through the device.

When the medium spool is loaded onto the apparatus with the medium wrapped around the outsides of the capstans and fed into the take up spool, the medium forms the shape of a trapezoid. As the medium moves through the apparatus, a scanner, mounted inside the trapezoid, is configured to read each first barcode as it passes the scanner. The scanner is known in the art and is configured such that as the image medium advances through the apparatus the, scanner reads the entire barcode. Thus, the scanner is configured and mounted to emit a long narrow beam where the long dimension is perpendicular to the direction the medium travels. Such scanning and reading means are known in the art, and may be any type of means for reading coded symbols know in the art.

The information read by the scanner is transmitted electrically to a control device mounted to the workstation. The control device is preferably a computer configured to receive the scanned information, decipher it and translate it into two messages, and send the messages to print-heads. The control device, also send a request to the order computer if the first barcode does not contain annotation information. The request would include a message comprising the order number and/or image number such that the annotation information stored on the order computer and associated with the particular first barcode being scanned will be transferred to the control device. In addition, the control device comprises a device, such as a PLC, that interfaces between the control device and the drive system motor. Such PLC devices, or similar devices, are known in the art for use in process control systems.

The print-heads are commercially available ink jet print-heads and are mounted to the top surface of the workstation table at the rear of the table. One print-head is mounted above the other on the outside of the trapezoid so that the messages are printed on the outside of the medium as it passes through the annotation apparatus. The outside of the trapezoid formed by the medium corresponds to the image reverse side of the medium.

The print-heads are electrically connected to the control device, preferably by electrical wires, with the wires run under the table top to avoid interference with the advancing medium as it follows its trapezoidal shape. The upper print-head prints the annotation information and the lower printhead prints the second barcode. A convection heater may be mounted to the table to heat the area where the information was just printed with the ink jet print-heads, thereby facilitating drying to prevent smearing. After the information has been printed and heated, the advancing medium is collected on the take up spool for transporting to the cutter.

DETAILED DESCRIPTION OF THE INVENTION

Figure 1:
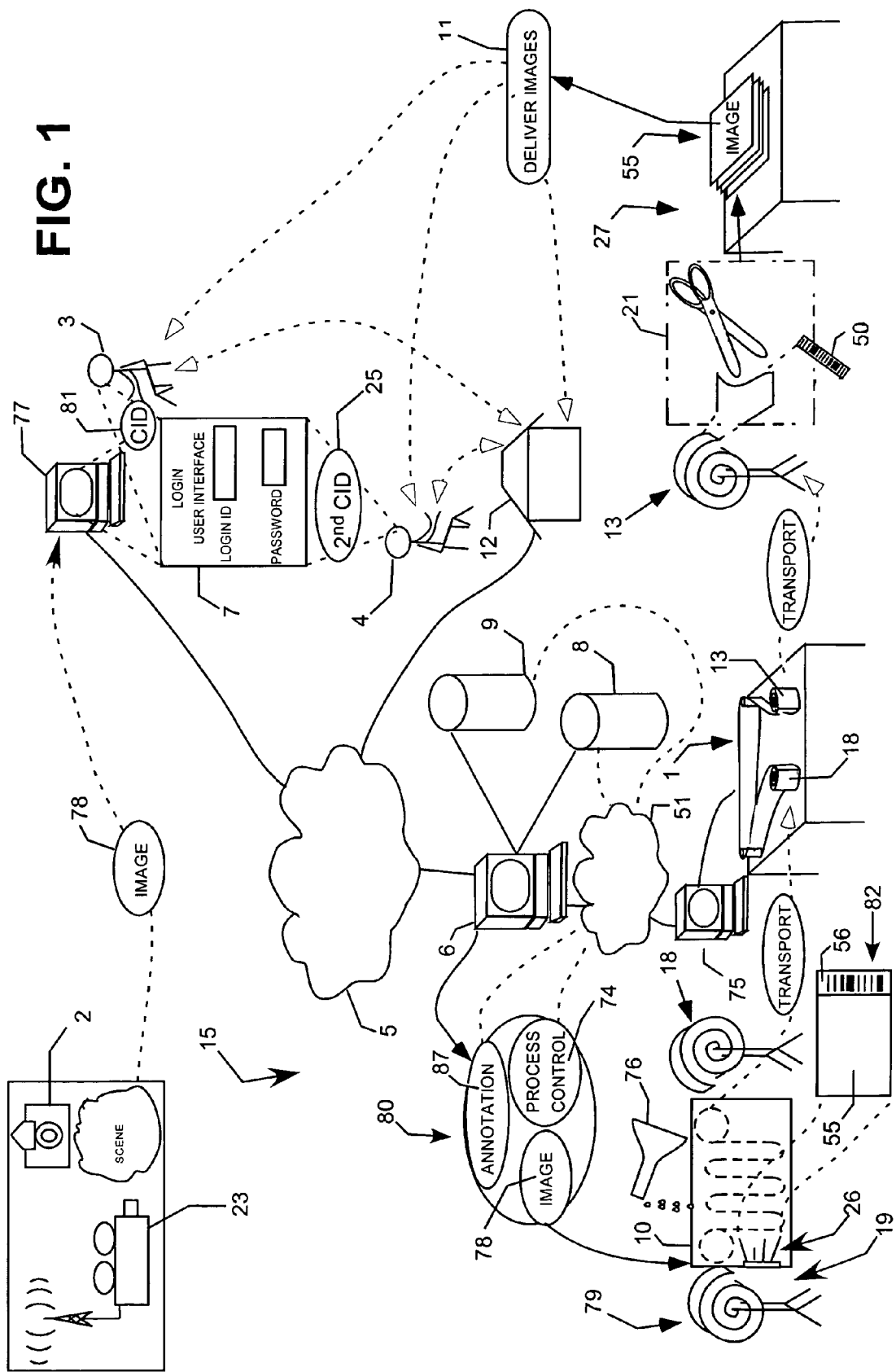
FIG. 1 illustrates a system for printing digital images.

Turning now to the drawings, in which like numerals indicate like elements or steps throughout the several figures, FIG. 1. illustrates an annotated digital photograph processing system in accordance with an illustrative embodiment of the present invention. The system 15 is suitable for processing an order for printing and annotating an image 55 derived from a digital electronic image 78 on a medium 79, such as photographic paper. The system 15 includes several components including a digital image source, such as a digital camera 2 or a live television broadcast 23 and user interface 7 displayed on a customer computer 77 that is connected to the Internet 5. The interface 7 is preferably an Internet browser used to access software that resides on computer server 6. Server computer 6 operates the system 15 by controlling certain actions. These actions include receiving and storing digital images 78 to be printed, creating customer profiles, granting access to a customers account upon a login request by said user and generating a composite image file 80 for printing by the printing system 15.

The computer server 6 can be any computer system capable of providing service to multiple customers simultaneously. For example, the server 6 is preferably a personal computer ("PC") operating client-server operating system, having an Internet connection 5 that allows multiple users to simultaneously access the system 15. Such computer server technology is known by those skilled in the art and will not be discussed further except as necessary to discuss the preferred embodiment of the present invention.

The system 15 also includes an archive database 8 and a customer profile database 9 that reside on the server 6 hard drive, or other storage medium, and that are accessed by commands entered by a user through the interface 7. In addition, the system includes an image printer 10, and an annotation printer 1. The annotation printer 1 scans a first barcode 50 and prints a second barcode, an annotation, and cut-marks on the reverse of a printed image 55. At cutter workstation 21, the printed images 55 are cut and then the images are sorted and assembled at workstation 27. Finally, after an order of images 55 has been assembled, the order may be physically delivered by transportation means 11 known in the art.

The user interface 7 software resides on a server computer 6 and is preferably accessed by a remote computer via the Internet 5. A customer 3 may establish an account by submitting information through interface 7 to server 6. The account information is stored to a profile database 9. This information, such as name, address and account number is used for billing purposes as well as for delivery instruction.

The system 15 may be accessed by a customer 3 with a first CID 81 or by an alternate customer 4 using a second CID 25 using interface 7. The CID 81 or the second CID 25 is entered into the interface 7 when the customer 3 or alternate customer 4 logs in to server 6. The customer 3 can specify that another customer 4 can also access the image archive database 8 through the submission of a second CID 25. This allows limited access for viewing of the images without the ability to order or to have the order charged to a particular account. Second CID 25 can be configured for a variety of access levels, to allow, for example, an alternate customer 4 to order printed images 55 and have the order billed to the original customer's 3 account.

In another scenario, a customer 3 may restrict access so that an alternate customer 4 may only be able to view images but not order images. This would facilitate the typical scenario of a customer 3, such as a professional photographer, showing a proof sheet to the alternate customer 4, such as newlyweds, for viewing and selecting of images to be printed, without providing the ability to order the images directly. Otherwise, if the alternate customer (couple) 4 could enlarge the viewed images with the user interface 7 and order the images directly, the alternate customer 4 could submit the digital images under a separate account number and bypass the customer's (the professional photographer) 3 fee for the photography services.

Although the interface 7 is shown as a login screen that is known to those skilled in the art for those who use the Internet, the interface may include other screens as well. For instance, the interface 7 includes screens for creating an account and entering profile information. The interface 7 also includes a screen for submitting images 78, viewing images before ordering, submitting a textual annotation to be printed on the image reverse and ordering printed images 55. These other interface screens are discussed later in connection with FIGS. 5–9.

The archive database 8 and the profile database 9 are preferably implemented with commercial software residing on the server computer 6. The server 6 responds to commands entered into interface 7 and sent from the computer 77. The response to such commands typically begins by authenticating a user into the system based on either a CID 81 or a second CID 25. Once a user is authenticated, the system associates the CID 81 or the second CID 25 to an account profile stored in database 9. The profile contains address and billing information for the associated customer. In addition, the profile information includes a customer number that is associated with the CID 81 or the second CID used to login to the system.

After the customer number associated with the CID 81 or the second CID 25 has been retrieved by the computer 6, actions that follow will be linked to the customer number. These actions include receiving and ordering digital images 78 to be printed. When a customer submits images 78 to be printed, they are stored in the archive database 8. Then, with the interface 7 a customer 3 may view and select images 78 to print. Alternatively, an alternate customer 4 may be able to retrieve and order images 78 stored to the server 6 by a customer 3. When all images 78 to be ordered are viewed and selected, the server 6 generates an order number.

In addition to an individual customer 3 or an alternate customer 4, orders may also be placed by a retail photofinisher 12. The photofinisher 12 may accept digital images 78, or even traditional images from film, to be developed. A would-be customer may be reluctant to submit images 78 or credit card information over the Internet 5, but may be comfortable having a traditional retail photofinisher 12 develop pictures. The retail photofinisher 12 would either develop images on film and convert them to a standard digital format, or would merely accept image files already in a standard digital format, such as JPEG, GIF, BMP, etc. and upload the images to the system via the Internet 5. The images 55 would be delivered back to the retail photofinisher 12 via ground transportation 11 such as the U.S. Mail or other common carrier.

When a customer 3, alternate customer 4, or photo-shop 12 places an order to print images, computer 6 generates an order number. This order number is used for further processing steps. It may be combined with a customer number that corresponds to the CID 81 or second CID 25 used to access the system to form a packet of information called process control information 74. Alternately, the process control information 74 may only comprise an order number and image number if the amount of information a first barcode is limited, as will be discussed later. If this is the case, extra database lookup steps may be required.

When a customer 3 or alternate customer 4 selects an image 78 for printing, he or she may also want an annotation to be printed on the reverse of the image 55. In the preferred embodiment of the present invention, the annotation may include any character from the 128 character ASCII character set, which is known in the art. Thus, any type of alphanumeric information may be printed on the reverse of the printed image 55. The annotation information 87 is submitted to the system 15 using the interface 7 and is associated with the selected image 78 by the server computer 6.

Once the annotation information has been entered and the process control information 74 retrieved and generated by the computer server 6, the process control information is combined with the associated annotation information 87 and the associated digital image file 78 to form a composite image file 80. Composite images 82 are printed using an image printer 10, which is a commercially available image printer known to those skilled in the art for printing and developing photographic images. Composite images 82 are printed and developed on a medium 79, which is preferably traditional photographic paper. Projector 26 exposes the information from the composite image file 80 onto the medium 79 by using a lens and light source to project the image onto the medium while inside the printer 10. The composite image 82 is formed such that when it is projected and developed on the medium 79, image 78 occupies an area separate from the area reserved for the process control information 74 and the annotation information 87. The printer 10 also includes an ink jet print-head, or similar printing device, for printing cut-marks on the reverse of image medium 79 for each printed image. Then, the printer 10 punches holes at the cut-marks. These holes will be used to sever each printed rendering of image 78 from the medium 79, as will be discussed later.

The annotation information 87 and process control information 74 are merged together and printed as a first symbol 50, which is preferably a Code 39 barcode symbol known to those skilled in the art. Thus, the parts of the composite image file 80 are printed on medium 79 as an image 55 and as a first barcode symbol 50, such that the first barcode precedes the image relative to the direction of medium travel. It will be appreciated that other types of symbols may be used, including, but not limited to, PDF417. But, symbologies other that Code 39 may be limited by the type of medium 79 used, the quality of the printer in apparatus 10 and the scanner in apparatus 1.

As composite images 82 are printed, medium 79 material is fed into the printer 10 from supply spool 19. As multiple composite image files 80 are printed as composite images 82 on the medium 79, the medium is advanced through the printer 10 and received on take-up spool 18. One skilled in the art may refer to the feed spool as an "unwinder" and the take-up spool as a "winder." However, because the same spool that functions as the winder for printer 10 is the unwinder for the annotation apparatus 1, the more generic terms are used in this description for purposes of ease and clarity.

When all of the medium 79 has been fed into printer 10 from spool 19 and received on spool 18, spool 18 is transported to annotation printer 1 for printing the annotation information 87 and process control information on the reverse of image 55. It will be appreciated that information is printed on the reverse of image 55 after the composite image information 80 has been printed and developed. This sequence provides one of the benefits of the present invention because the ink used to print information on the image reverse is not subjected to the chemicals used to develop the composite image 82 in printer 10. Thus, if black ink is used to annotate an image, the ink color does not change to pink, light blue, or other color. Such a color change typically occurs when black ink is applied to the back side of an image medium before the medium is chemically processed.

As the annotation and process control information are printed on the reverse of images 55, the medium 79 is received on take-up spool 13. When all the medium 79 from spool 18 has been received on spool 13, spool 13 is transported to cutter workstation 21 for cutting. The cutting workstation 21 is preferably an automated apparatus, known in the art, that senses holes created by printer 10 and cuts the medium 79 at the holes. Alternatively, the cutting workstation may be any means for cutting known in the art, such as a scissors or a paper cutter. If photo-shop personnel are used to cut the images 55 from the medium 79, the cutting personnel may either cut the medium at the holes or the cut-marks, as shown and described in later in connection with FIGS. 4B and 4C.

As medium 79 is received at cutter workstation 21, the first barcode symbol 50 and image 55 are severed for each composite image. The medium 79 is cut at the holes or cut-marks that were printed on the reverse of image 55 by printer 10, and the section of the medium containing the first barcode 50 is discarded. The holes and cut-marks are discussed in greater detail in connection with FIGS. 4A, 4B and 4C.

Cut images 55 are then arranged according to order number at order assembly workstation 27. In the preferred embodiment, the images 55 are sorted by photo-shop personnel according to an order number printed on the image reverse as part of the process control information. However, this process may be automated if the photo-shop chooses to use an automated cutting machine. If an automated machine is chosen, the process control information, including order number, may be read from the second barcode.

Figure 2:
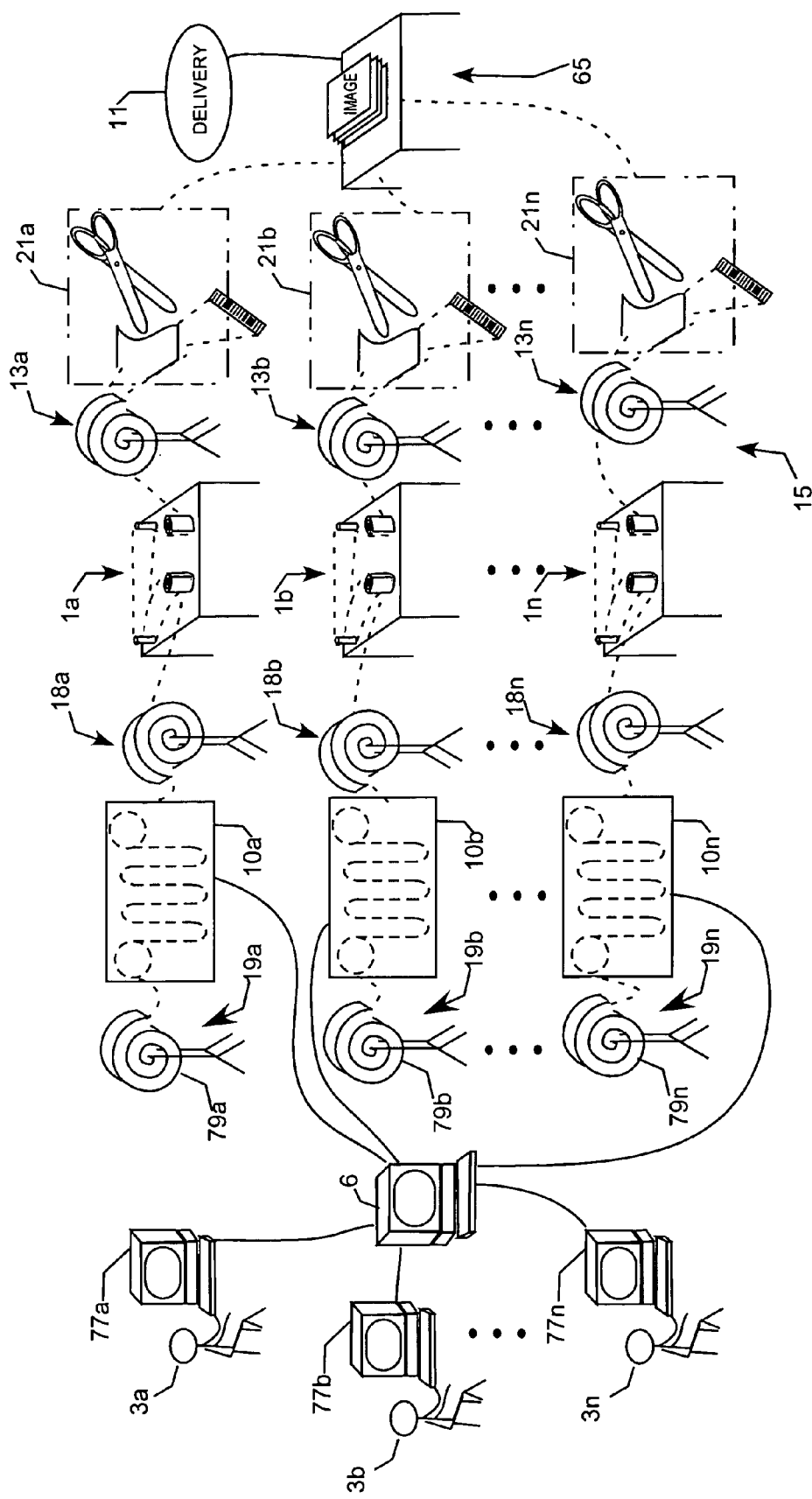
FIG. 2 is a schematic diagram illustrating multiple annotation apparatuses to facilitate simultaneous printing on different size rolls.

Turning now to FIG. 2, a schematic diagram illustrates a configuration of multiple annotation printers 1 for printing multiple images 55 of various sizes simultaneously. The server computer 6 directs images received from a plurality of customers 3 to a plurality of image printers 10. The plurality of image printers 10*a–n*, annotation printers 1*a–n* and cutter workstations 21*a–n* expands the capabilities of a printing enterprise by allowing simultaneous printing of images 55 of different sizes. For example, if customer 3*a* orders images to be printed on 5"×7" paper, these images may be printed at the same time that images ordered from customer 3*b*, which may be a different size, are being printed. It will be appreciated that, although the FIG. 2 illustrates customers 3*a–n*, the computer 6 may also simultaneously receive orders from an alternate customer 4, or a retail photo-shop 12, both shown on FIG. 1. Essentially, the components of each of the trains a-n are identical to their corresponding component in the other trains. This is true regardless of the size of print medium 79*a–n* used, with the exception that the medium supply 19*a–n* and take-up spools 18*a–n* and 13*a–n* may vary according to the size of medium used. Thus, for clarity purposes, FIG. 3, which will be discussed momentarily, is used to illustrate the system configured for a single size of print medium.

Figure 3:
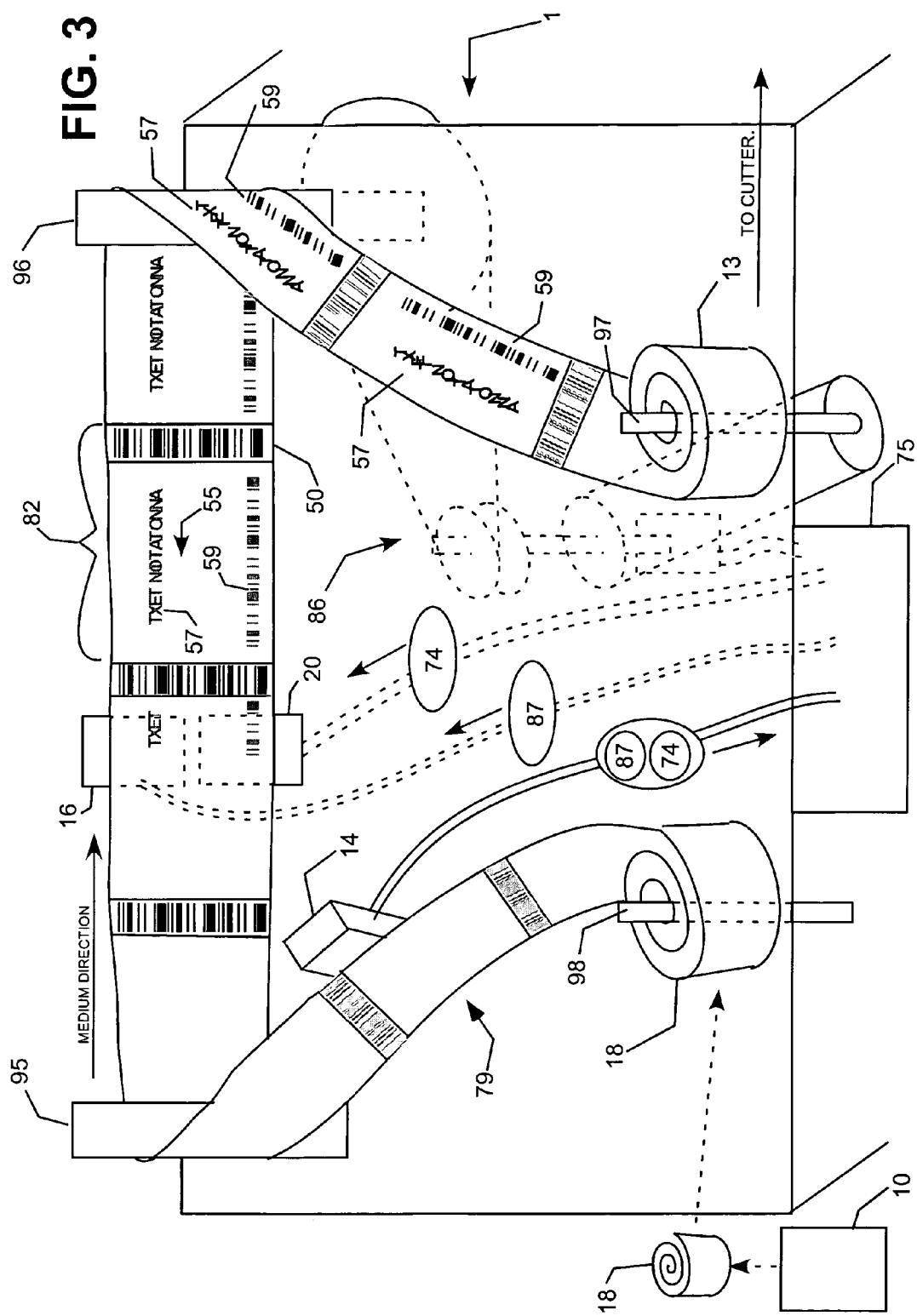
FIG. 3 illustrates the annotation apparatus.

Turning now to FIG. 3, an annotation printer apparatus 1 is illustrated. The annotation printer 1 is configured as a workstation where medium 79 is fed from spool 18, which took up the medium output coming from the image printer 10, as shown in FIG. 1. The various components that make up the annotation printer 1 are mounted to, or proximate to, a table 85. Spool 18 is placed on spindle 98 and the medium is threaded around capstans 95 and 96, and finally attached to take up spool 13, which is placed on spindle 97. Thus, spindles 98 and 97, and capstans 95 and 96 may be viewed as the vertices of a trapezoid, which is formed by the medium 79 when threaded as previously described.

A motorized drive system 86, mounted below table 85, drives spindles 97 and 98, and regulates the speed of capstans 95 and 96. The motorized drive system 86 may comprise belts and/or gears, or other mechanisms known to those skilled in the art, that advance the medium 79 through the apparatus printer 1. The motorized system 86 is connected to controller 75 so that the speed at which the medium 79 advances through the printer 1 is regulated to coordinate with various printing operations.

These printing operations include printing an annotation 57 and a second barcode 59. The annotation 57 and second barcode 59 are printed on the reverse side of the medium 79, directly behind the image 55 to which they correspond. Thus, the devices that actually print the annotation 57 and the second barcode 59 are coordinated by the controller 75 to ensure that the they are printed on the reverse of the correct image 55.

To illustrate that the annotation 57 and barcode 59 are printed on the reverse of image 55, the annotation and barcode are shown in the figure in light gray on the section of medium 79 that spans between capstan 95 and capstan 96. This light gray contrasts with the darker rendering on the figure of first barcode 50. On the section of medium 79 that spans between spindle 98 and capstan 95, the first barcode is rendered in light gray because it is on the opposite side of the medium as shown in the figure. Likewise, on the section of medium 79 that spans between capstan 96 and spindle 97, the first barcode 50 is also rendered in light gray, but the annotations 57 and second barcodes 59 are rendered darkly to show that they are on the opposite side of medium 79 than the first barcode.

The devices that print the annotation 57 and the barcode 59 are ink jet print-heads 16 and 20 respectively. Each print-head is connected electrically to the controller 75. Controller 75 may be a PC, or other computer device, and related peripherals known in the art and typically used for controlling similar devices.

The annotation printer 1 uses scanner 14, which is electrically connected to controller 75, to read the first barcode symbol 50. The scanner 14 is known to those skilled in the art for reading barcode symbols and is located inside the trapezoid formed by medium 79, such that each first barcode 50 is read before it reaches capstan 95. Thus, the controller 75 can read the barcode 50 and print the annotation 57 and the second barcode 59 on the reverse of the appropriate image 55. The controller 75 can determine when to print annotation 57 and second barcode 59 because the geometric relationship between the scanner 14 and the print-heads 16 and 20 is fixed and known by the controller, and the speed regulated by the capstans 95 and 96 is constant and known by the controller. Thus, the controller 75 performs time calculations and instructs the print-heads 16 and 20 to print the second barcode 59 and 57 that correspond to the image 55 that is advancing past the printheads.

As the information from first barcode symbol 50 is read by scanner 14 and fed into controller 75, the process control information 74 and the annotation information 87 from the first barcode are separated into different information packets. The controller 75 then sends the annotation information 87 and the process control information 74 to print-heads 16 and 20 respectively at the appropriate time as the medium 79 moves through the annotation printer 1. Thus, the resulting annotation 57 and second barcode 59 are printed as strings parallel to the direction that the medium moves through the annotation printer 1.

As discussed above in connection with FIG. 1, the process control information 74 encoded into first barcode 50 may only include a sequential order number and image number generated by server 6 when a customer places an order. In addition, annotation information may not be included in the first barcode. If annotation information is not included in the first barcode, the annotation must be retrieved from the server computer 6 from database 8, based on an image order number read from the process control information 74 read from the first barcode 50. This may be required based on the type of medium 79 used, which in turn may dictate the symbology used by system 15. If the process control information 74 only includes an order number and image number, the controller 75, which may be electrically connected to server 6 via a dedicated network 51 or the Internet 5, sends the order number and image number read from the first barcode by scanner 14 to the server. Then, the server 6 performs a database lookup operation of profile database 9 and archive database 8, which may be indexed according to order number and image numbers in question, respectively. Then, the server 6 returns the customer number associated with the CID 81 or 25 used to place the order corresponding the order number in question to the controller, and the annotation information if applicable. The controller then combines the order number and the customer number into process control information, and annotation information if applicable, to be printed by the annotation printer 1.

Notwithstanding that the controller 75 may be connected to server 6 to perform database lookup, the controller does not have to be connected to server 6 for the annotation printer 1 to print on the reverse of image 55, as long as the first barcode 56 contains all the required information so that the database lookup operations previously described are not required. Since the controller 75 controls print-heads 20 and 16, scanner 14, and the medium 79 travel speed, medium that has been printed by printer 10, as shown in FIG. 1, does not have to be processed immediately by annotation printer 1. This allows composite images 82 to be printed on medium 79 at one location and the annotation 57 and second barcode 59 to be printed at a different location and/or at a different time if desired. After the medium 79 has been printed upon by the annotation printer 1, the medium is collected on spool 13 for transport to the cutter workstation 21, shown in FIG. 1.

Figure 4:
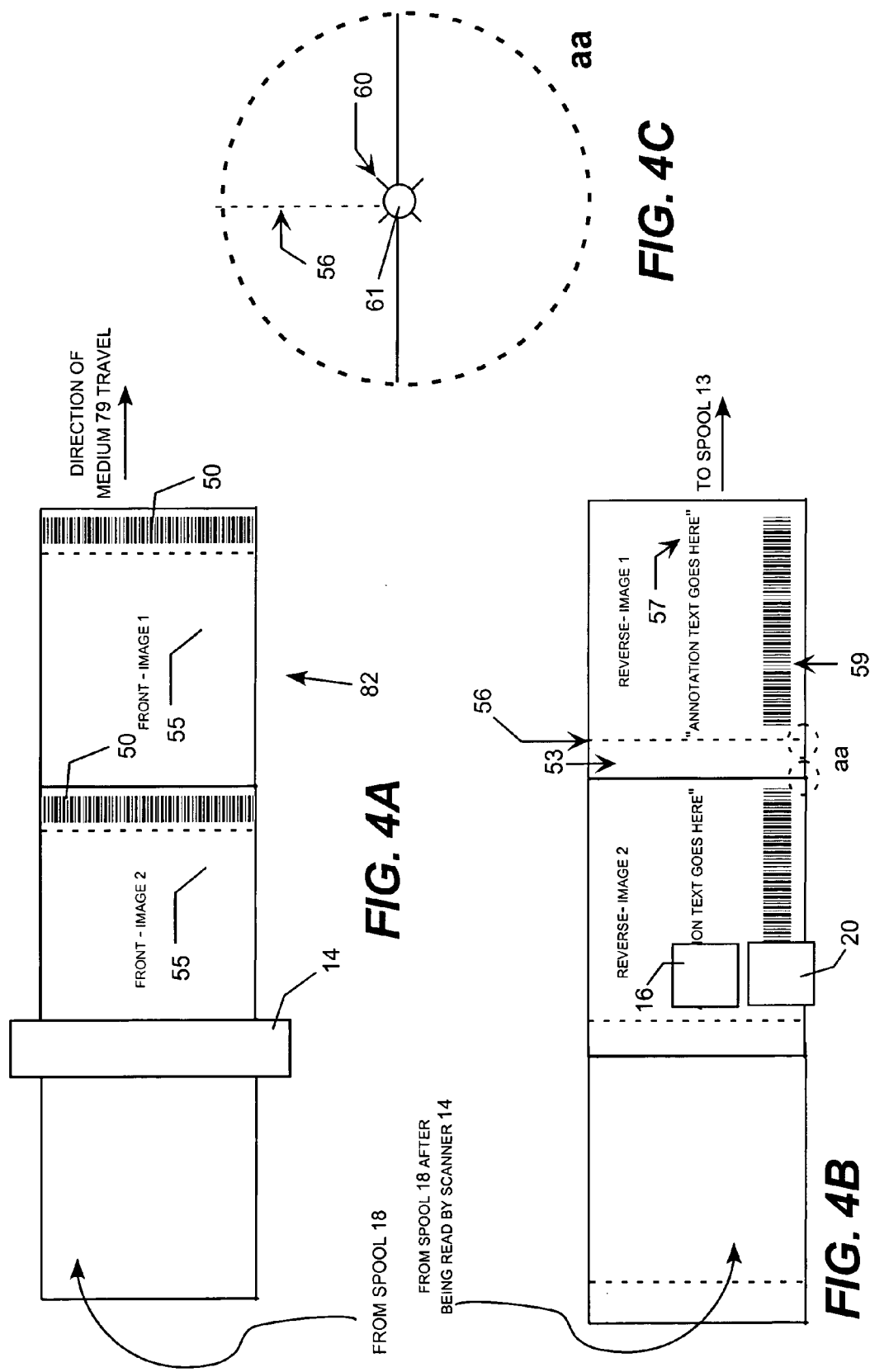
FIG. 4A illustrates the layout on the front of the image medium after the image, including the front barcode, has been printed.
FIG. 4B illustrates the layout of the image reverse after the annotation, barcode and cut-marks have been printed.
FIG. 4C is a section view of the area surrounding a cut-mark on the image reverse.

Turning now to FIG. 4A, the front of the medium 79 is illustrated as it passes scanner 14 of the annotation printer 1. As discussed earlier, the first barcode 50 precedes the image 55 as the medium 79 advances through the annotation printer 1.

FIG. 4B illustrates the reverse side 58 of the medium. After the first barcode 50 has been read by the scanner 14, the information extracted therefrom is processed by controller 75, which directs the print-head 16 to print the annotation 57 on the image reverse. In addition to printing the annotation 57 on the image reverse 58, print-head 20 prints second barcode 59 on the image reverse. This second barcode 59 contains the process control information 74 extracted from the first barcode 50 as shown in FIG. 3, but not the annotation information 87. The dashed vertical lines 56 indicate the location where the paper will be cut, leaving only the printed image 55.

FIG. 4C depicts an exploded view of section aa from FIG. 4B. Section aa highlights cut-marks 60 that may be printed by printer 10, which mark the location for the medium 79 to be cut at cutter workstation 21 to crop the first barcode 56 from the medium paper. The vertical dashed line 56 indicates where the medium 79 will be cut. Optionally, a transducer, preferably an LCD sensor known in the art, may sense the hole or holes 61, which are punched by printer 10, for cutting such machine that senses such holes for cutting the medium 79. Such hole marking, punching, sensing and cutting operations, and the devices used to facilitate the operations, are known in the art.

The preferred cutter at cutter workstation 21 is automatic, and senses the holes 61 created by printer 10 and cuts the medium 79 at the appropriate locations such that the section 53 of medium 79 that contains first barcode 56 is severed therefrom. Thus, all that remains are individual cropped images 55 on separate pieces of photographic medium 79. Alternatively, the cutter workstation 21 may use human personnel to sever the portion 53 of medium 79 that contain first barcode 50.

After the images 55 have been severed from medium 79 at cutter workstation 21, the images are transported to workstation 27 for assembly in preparation of order shipment. Process control information 74 is used to assemble an order according to order number. The process control information is included in the second barcode 59. Thus, an automatic sorter, known to those skilled in the art, may be used to scan the second barcode 59 and sort and assemble all images having identical process control information included in the second barcode 59. However, the process control information 74 may also be printed in alphanumeric ASCII text characters proximate to the second barcode 59 by print-head 20, so that human personnel may manually assemble the images 55 that have identical process control information.

If the printed process control information 74 includes only an order number and customer number, a computer database or a printed list may be used to look up the corresponding shipping information, i.e. address, phone number, customer name and optionally print a shipping label containing such information. Then, a completed order is packaged and shipped to the appropriate shipping address using tradition delivery methods.

Figure 5:
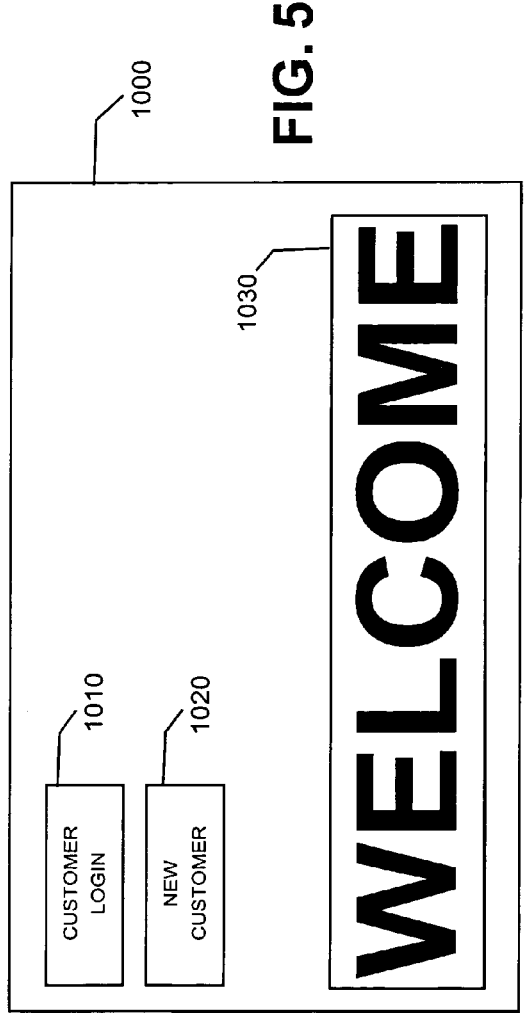
FIG. 5 illustrates the welcome web page of a user interface.

Turning now to FIG. 5 a typical welcome screen 1000 is illustrated that a customer 3 or alternate customer 4 might see upon entering a URL for a photofinisher into their internet browser. The welcome sign 1030 can be any sign, including a company logo. The welcome screen can display control items, such as the CUSTOMER LOGIN button 1010 and the NEW CUSTOMER login button 1020. These control items can be typical hypertext markup language ("HTTP") links that link to other input screens. The welcome screen 1000 is part of the interface 7 that allows a user to submit images and order images for printing.

Figure 6:
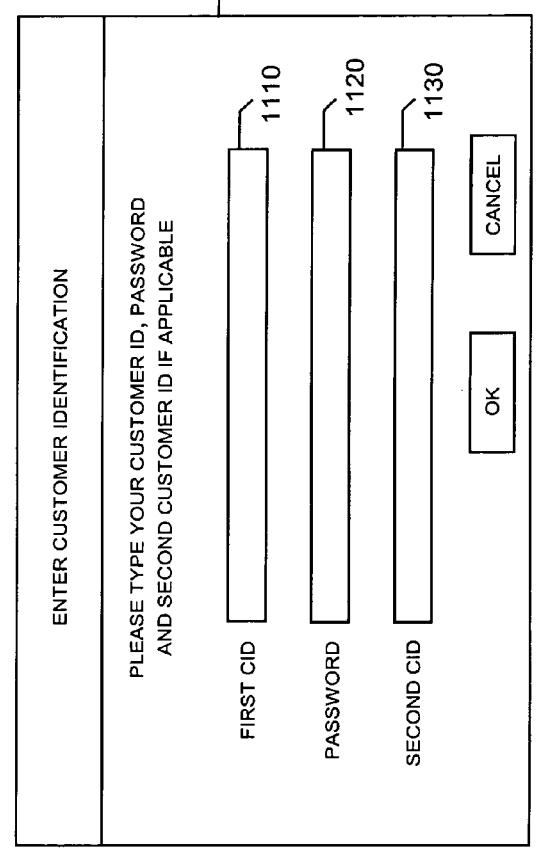
FIG. 6 illustrates a customer login dialog box.

FIG. 6 illustrates a typical customer identification interface 1100 for entering identification information. This information includes a customer name and password, which are known to those skilled in the art and are commonly required to gain access to a particular web site. The customer identification interface provides control items for each of the identifiers. This is accomplished with a text bar 1110 for entering a username, another text bar 1120 for entering a user selected password and yet another text bar 1130 for entering an second CID 25 if applicable. Pressing the CANCEL button closes the customer identification interface 1100 and redisplays the welcome screen 1000. Pressing the OK button advances the Internet browser to the image order interface 1205, which is described in greater detail with reference to FIG. 7.

Figure 7:
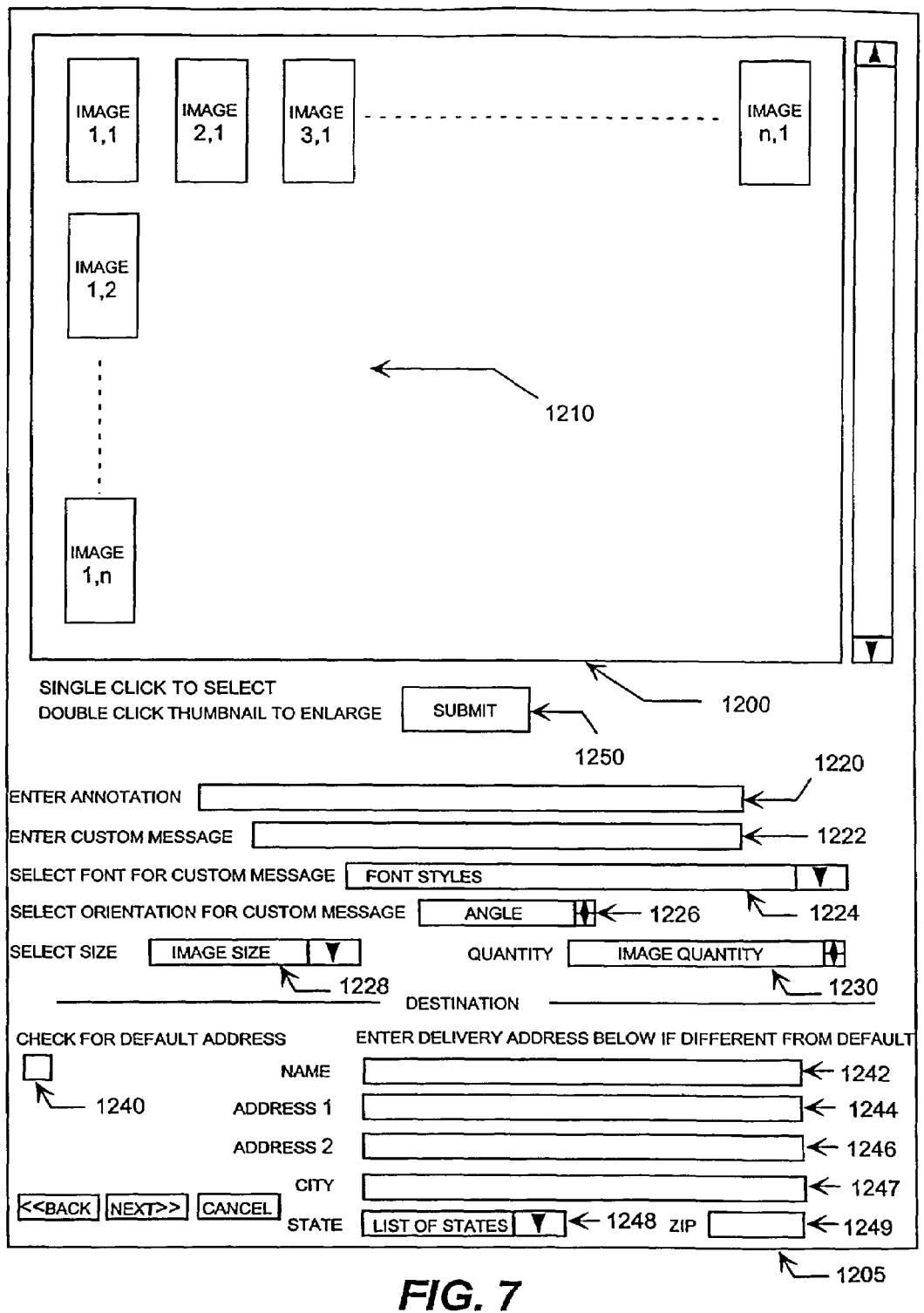
FIG. 7 illustrates an order interface for viewing thumbnail images and entering order specifications.

FIG. 7 is an illustration of the image order interface. Clicking the SUBMIT button 1250 causes a dialog box to display that allows the user to browse the storage devices attached to the user's computer for a digital image file to submit to the system. This dialog box is a standard dialog box created by the operating system of the user's computer that allows searching of a hard drive or any other storage device for storing electronic files. When images have been submitted to the system, either via the internet as described above, delivering a computer disk to a photofinishing facility or by any other means, a customer may view the images that have been submitted that are associated with his customer identification. These images are displayed in the interface 1205 in the image viewing section 1200. The images are displayed as thumbnail images 1210. The thumbnail images 1210 are control items in addition to being miniature representations of the stored electronic images. By using a pointing device such as a mouse, an image may be selected by single clicking on the thumbnail 1210. Furthermore, by double-clicking on an image, the image will be enlarged and displayed in the image viewing area 1200 as a full size image based on the image resolution. If more images are stored in the archive database 8, shown in FIG. 1, than can fit as thumbnail images 1210 in the image viewing area 1200, a control item such as a scroll bar will scroll the image viewing area 1200 so that all the thumbnail images 1210 are viewable and selectable.

One image may be selected at a time. When an image is in an unselected state, the remainder of the order interface 1205 will be dim to indicate that order data may not be accepted. When an image is in a selected state, the order portion of the interface 1205 will appear as standard text and control items, which will allow information to be entered. The control items include a text bar 1220 for entering an annotation 57 to be printed on the image reverse, where the annotation comprises computer characters.

The control items further comprise a text bar 1222 for entering a custom message to be printed on the image front as part of the image. This message also comprises computer characters, which may be rendered in a variety of font styles. The font is selected with a list box 1224 that lists a set of predetermined fonts that are stored on the server 6. The set of predetermined fonts may include standard fonts such as Times New Roman or Ariel, or may also be generated by sampling a handwriting example. The handwriting example will most probably come from a celebrity. Thus, a customer 3 or alternate customer 4 can enter a message to be printed as an overlay on top of the image to be printed by the image printer 10. If a selected image for printing was of a celebrity, the customer could enter a message that would appear as if it were signed by the celebrity. After the message has been entered and the font selected, an orientation angle can be selected with scoll box 1226. This angle can be any angle, but will typically be at an angle between 0 and 45 degrees.

When the image, annotation, custom message and associated attributes have been selected, the interface 1205 allows the selection of image size and image quantity. List box 1228 provides a means for selecting from a set of predetermined sizes. The sizes correspond to the paper sizes contained on supply spool(s) 19. Thus, the available sizes in the list box 1228 may vary depending upon the configuration of the system and how many printer apparatuses the photofinisher has. Scroll box 1230 provides a means for selecting the quantity of the selected images that will be printed. Theoretically, this value may be infinite, but is practically limited by the length of the paper roll contained on spool 19.

Finally, the address to which to send the order may be selected. Interface 1205 provides text bars 1242, 1244, 1246, 1247 and 1248 for entering name, address1, address2, city and Zip Code respectively. List box 1248 provides a list from which to chose the delivery state. If a particular session is a user's first session, these control items will appear blank and the user must enter the information. This information may then become associated with the username and password used to access the system. However, if the particular session is not a user's first session, the delivery information will have already been entered and will appear in the corresponding control items. The appearance of the previously entered information in the control items will be dim if the default address checkbox 1240 has been selected. Checking box 1240 ensures that the delivery address will be the same as the previously entered address for previously ordered images, thereby reducing delivery errors.

After an image has been selected and the corresponding order specifications have been entered through the order interface 1205, the user may select BACK, NEXT or CANCEL from buttons appearing at the bottom of the interface 1205. Choosing BACK displays the identification screen again. This operation would be chosen at this point if a customer realized that an incorrect username had been entered. For instance, a boy might enter a username and password granting him access to his family's account, only to determine that a particular image he wanted to order was associated with his sister's username. Thus, he could enter the correct username so that the desired images would be displayed in the interface 1205. Choosing CANCEL would cause the welcome screen 1000 to be displayed. This operation logs the user out of the account.

Figure 8:
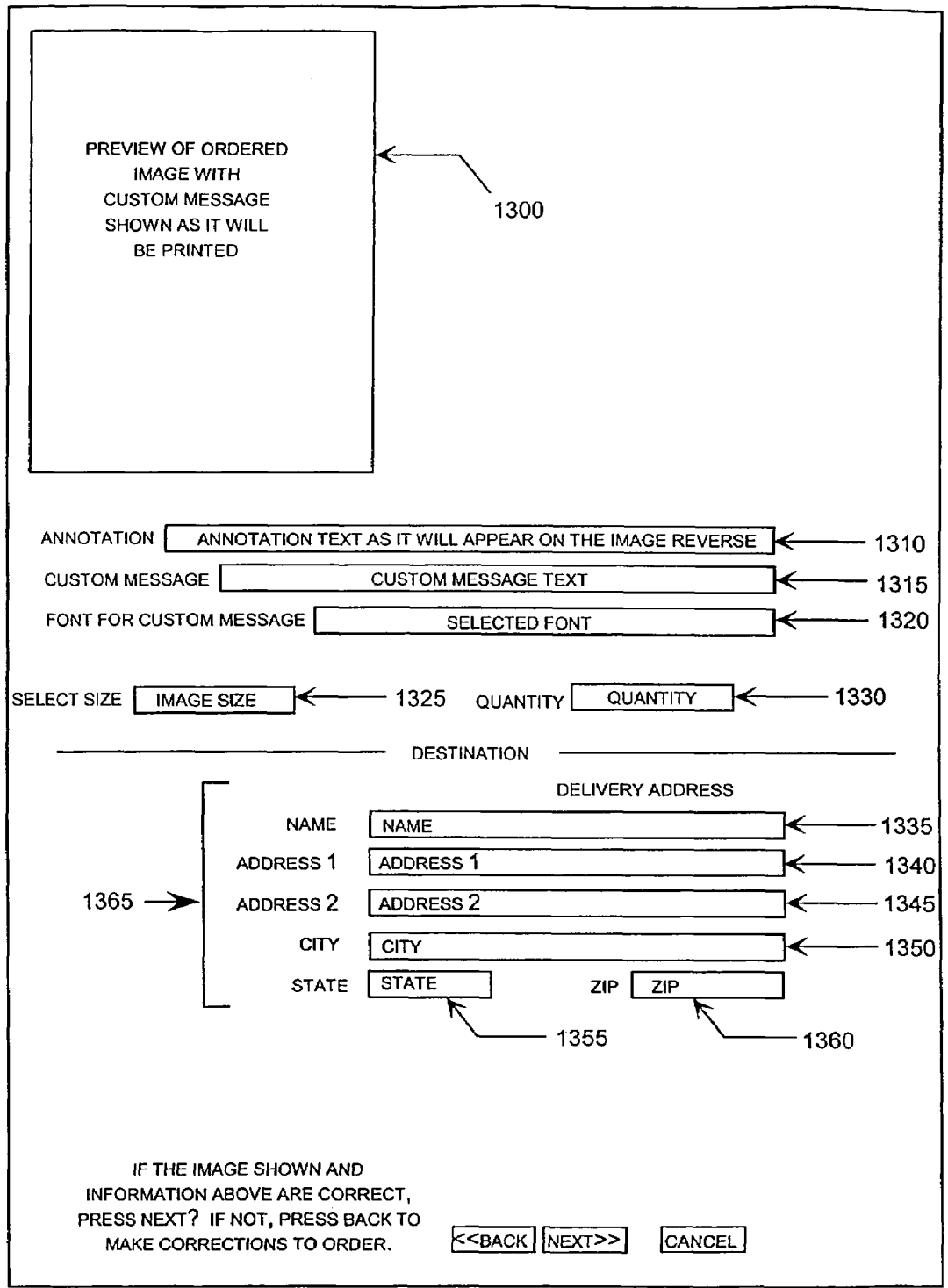
FIG. 8 illustrates a confirmation interface for confirming each ordered image and the specifications associated with each ordered image.

FIG. 8 illustrates the ordered image confirmation interface screen 1305. Choosing NEXT from the interface 1205 screen sends a command to the server 6 that the user wants to place the order in accordance with the information entered through the interface 1205. This order applies only to the selected image and causes the order confirmation interface 1305 to appear. This interface 1305 displays the selected image and the associated information. This information includes the annotation, custom message, custom message font, image size, image quantity, name address 1, address 2, city, state, and Zip Code. This information is displayed in text boxes 1310, 1315, 1320, 1325, 1330, 1335, 1340, 1345, 1350, 1355 and 1360 respectively. If the information appears incorrectly, the user may click the BACK button and the bottom of interface 1305 and make the appropriate correction with the appropriate control item. If the information is correct, the user may click the NEXT control button at the bottom of interface 1305. This will generate a dialog box asking the user if more images are to be ordered or whether the order has been completed. If the user selects a control item corresponding to a request to order more images, the order interface 1205 is displayed again and the process is repeated for ordering another image. If all images have been correctly ordered, the user may click the the NEXT control button at the bottom of the interface 1305 and proceed to enter billing information.

Figure 9:
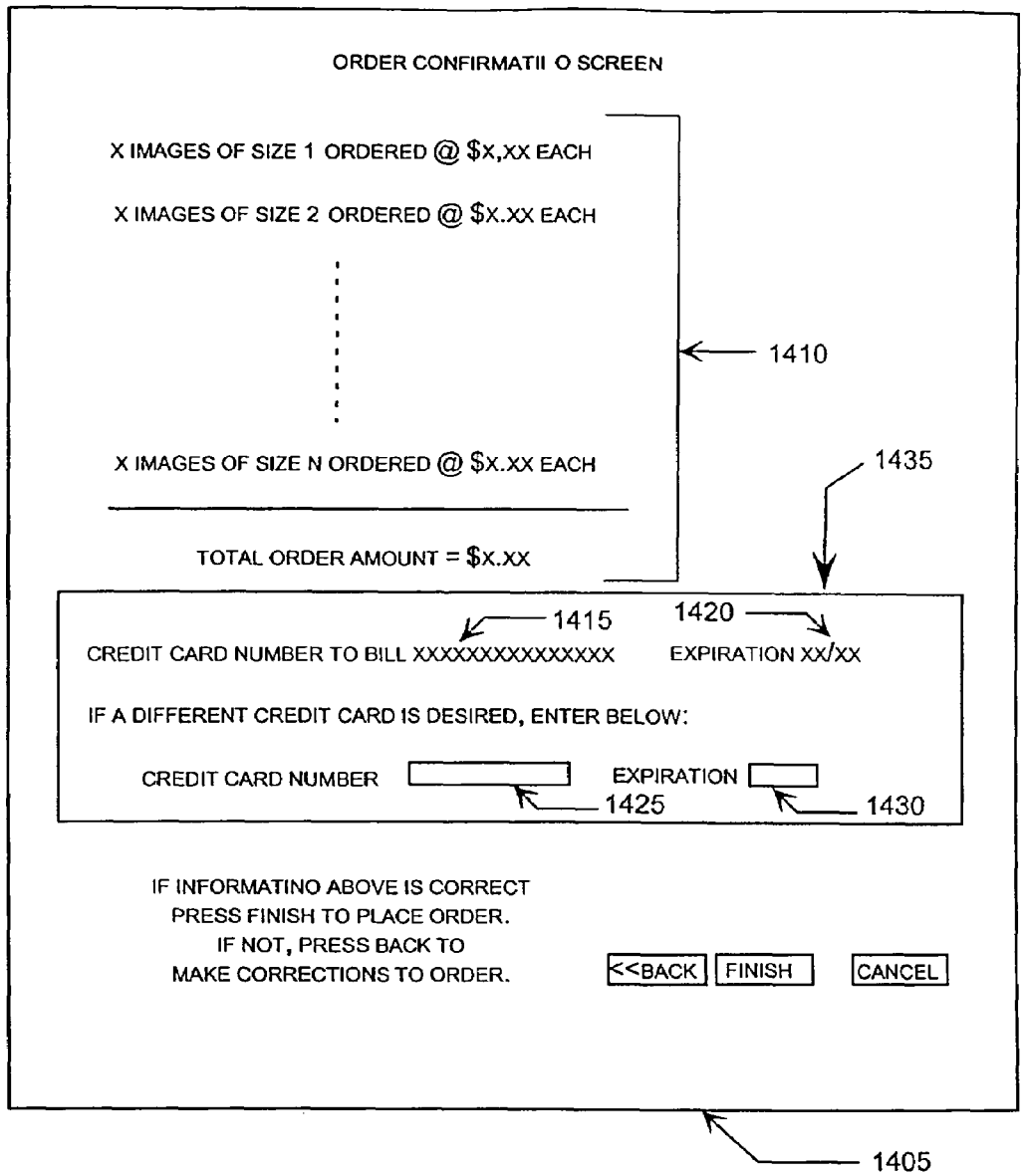
FIG. 9 illustrates another order confirmation interface for confirming the total order, the information associated with a credit card to be billed, and an interface for entering a different account to bill of so desired.

FIG. 9 illustrates the final confirmation interface screen 1405. The final confirmation screen 1405 displays the ordered images, the associated sizes, quantity and a total dollar amount in area 1410. The user may review the order and click the BACK control button to access the appropriate screen for correcting the order if the order is not as described. When the order is satisfactory to the user, the user then enters billing information. Typically, this will involve a credit card account number and the card's expiration date. These items are entered into the text bars 1425 and 1430 respectively. The entered information is displayed in text boxes 1425 and 1425 for the account number and the expiration date respectively. If the user is satisfied that the order is correct and the correct delivery and account information have been supplied, the user may click the FINISH control button at the bottom of the interface 1405 and the order will be transmitted to the system for processing.

Figure 10:
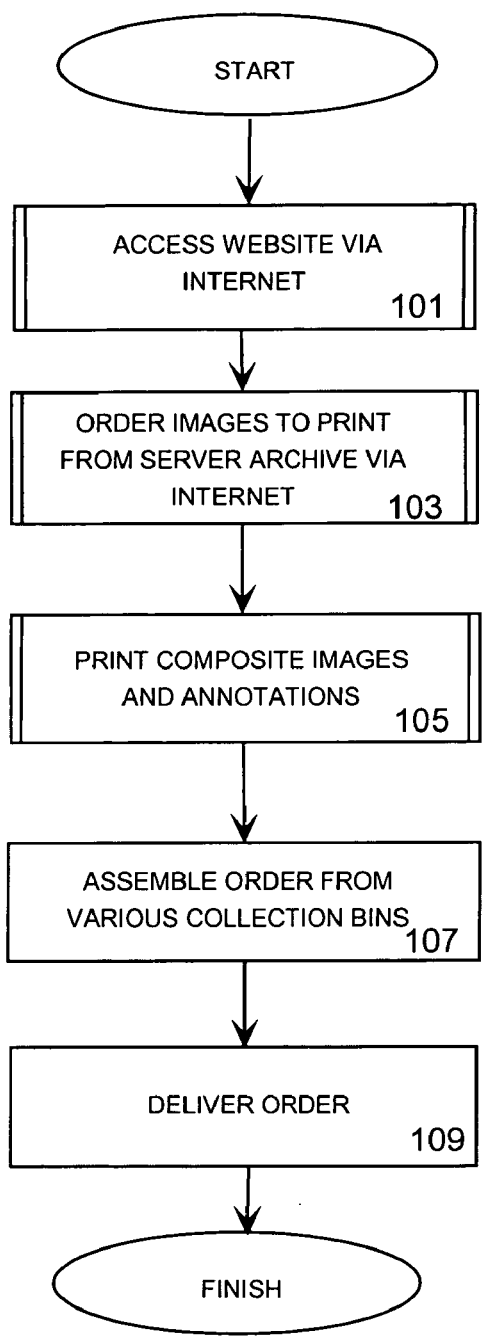
FIG. 10 is a flow diagram illustrating a photograph production routine for an online photograph ordering system.

FIG. 10 is a logic flow diagram illustrating a routine 100 for operating the annotated digital photograph processing system. In step 101, a user accesses the computer server 6 via a network 5, preferably the Internet, using a personal computer 77 with software for browsing the Internet. The user enters a URL that is associated with a photofinisher, thereby establishing a connection between the user's computer and the photofinisher's server computer. In step 103 the user selects electronic images 78 to be printed as photographic images 55 on photographic light sensitive paper media 79. These may be images 78 that have already been submitted to the system 15 or the user may submit images to be printed as well as select images already submitted. When the user has submitted a request to print images 78 at step 103, the system operates various equipment necessary to produce the photographic images 55 with annotations printed on the reverse at step 105. When the ordered images 78 have been printed at step 105, a particular customer's order is assembled and readied for delivery as indicated by step 107. Once the order has been assembled, the order is shipped to a delivery address as indicated in step 109.

Figure 11:
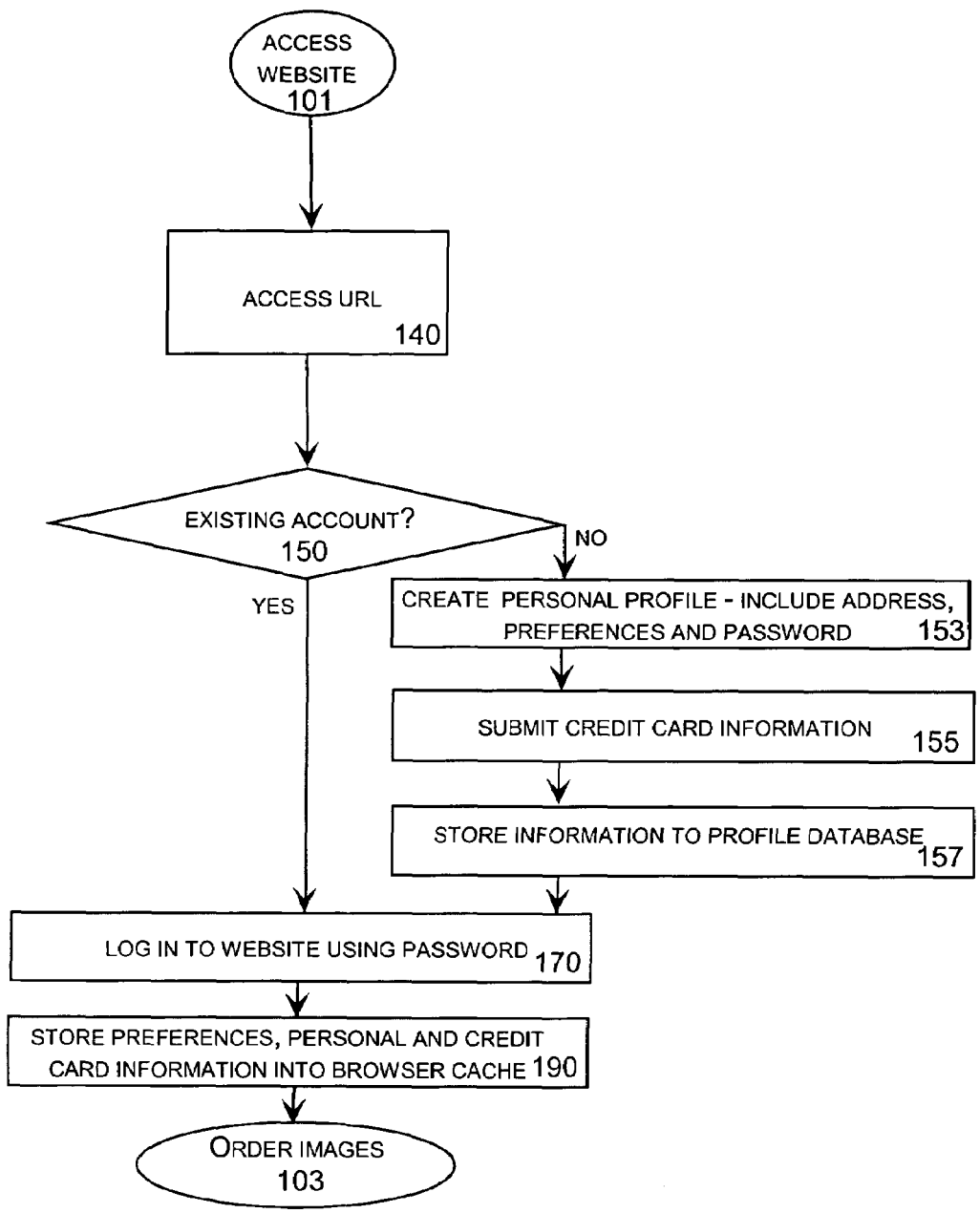
FIG. 11 is a flow diagram illustrating account creation and access of a web site for an online photograph ordering system.

FIG. 11 is a logic flow diagram illustrating routine 101 for accessing the photofinisher computer server 6 through the photofinisher's web site via the Internet. After the user enters the photofinisher's URL at step 140, the system displays the welcome screen 1000 shown in FIG. 5, so that the user may enter the web site. If the user selects button 1010 by clicking it with a pointing device such as a mouse, the system displays a dialog box 1100, shown in FIG. 6, for entering customer identification information. Entering this information at step 170 allows the user to access the system's features through the server computer 6. If the user is not a registered customer, the customer would have to select the NEW CUSTOMER button 1020 from the welcome screen 1000. Selecting NEW CUSTOMER 1020 would generates an interface screen that essentially combines the control items 1365 shown in FIG. 8 and control items 1435 shown in FIG. 9. Entering information into the control items is represented by steps 153, 155 and 157 as shown in FIG. 11. After the user information required to initiate a user account has been entered and a password has been determined, the CID 81 or second CID 25 is used to access the system server 6 at step 170. At step 190 a user may modify the information associated with his account, or the user may leave the information as entered by clicking NEXT on the interface screens containing the 1365 and 1435 control items shown in FIG. 9. After the account information has been entered and affirmed, the user may proceed to the image order screen. This action is represented by step 103.

Figure 12:
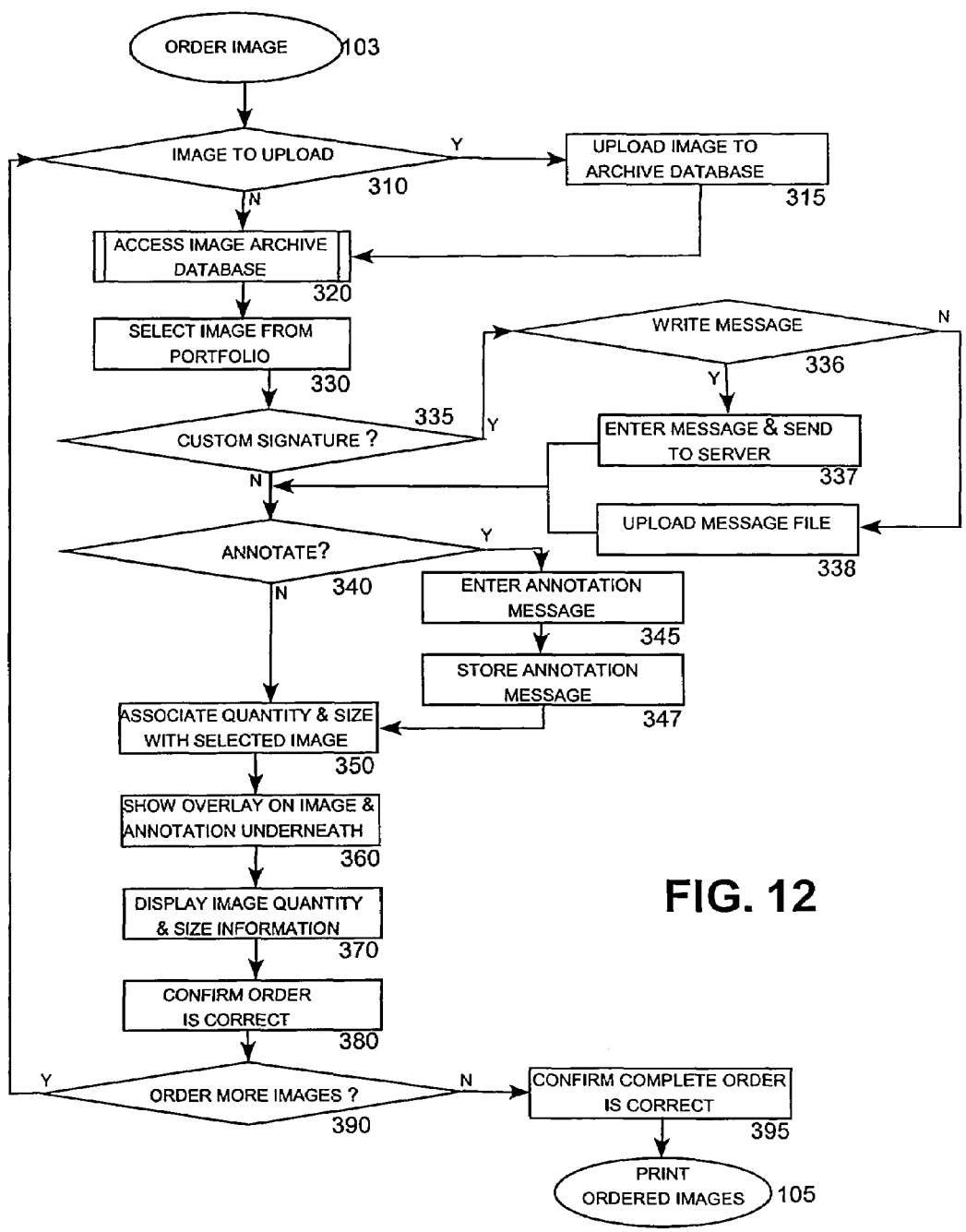
FIG. 12 is a flow diagram illustrating order placement for an online photograph ordering system.

Turning now to FIG. 12, at step 310, the user is queried whether there are new electronic images 78 to upload. If so, the user proceeds to step 315. The user will typically have an electronic image file from a camera, generated either from a digital camera or from a scanned image of a traditional photograph. The user will typically have transferred the image file 78 to the hard drive of the computer 77 being used to access the system server 6. This image file can be transferred with the user interface 7, shown in FIG. 1, or e-mailed as an attachment to the photofinisher's e-mail address. When images 78 have been uploaded to the system at step 315, the user may access the archive database 8, shown in FIG. 1, at step 320 and view the images that were uploaded at step 315 and that are associated with the particular user's account. These images 78 are viewed through interface 1200, shown in FIG. 7, which allows a user to select an image to print by clicking the thumbnail image with a mouse or similar device.

The preferred method is to allow one image 78 to be selected at a time. This prevents confusion as to which image to annotate, where to deliver an order and who to bill regarding a particular order. This is desirable because a particular user may wish to send different images 78 to different recipients, or even to bill different images to different accounts. However, an embodiment of the interface 7 software may be created such that multiple images may be selected without having an intervening interface screen requiring that the annotation, custom message, delivery and billing information be entered before selecting another image. Thus, the annotation 87 and process control information 74, as shown in FIG. 1, could be entered one time and associated with all selected images by selecting a single control item.

After an image 78 has been selected at step 330, the overlay message and annotation are entered into the appropriate control item through the interface 7. At step 335, a user decides whether to include a custom message or not. There is not a specific dialog box or other interface item requiring the user to choose to or not. Thus, if the user chooses not to include a custom message, the user merely leaves the appropriate control item 1222 blank. A blank item 1222 conveys to the computer server 6 that a custom message is not desired. If a custom message is desired, the custom message is uploaded at step 338 from a digital file on the user's computer. The custom message can be in the form of a computer object, such as another image file, or can be entered at step 336 as a text message into interface 7 for uploading at step 337 to computer server 6. If the image is uploaded at step 337 as a text message, the operations of selecting the font and angle of orientation are applied to the text message before the message is converted into another image file. Again, these are decisions made by the user and if the appropriate control items are left blank, the server applies default values, typically ariel font and zero degrees orientation. Once the message has been converted into an image file format and sent to server 6, the message is combined with the digital image file 78 so that the message is printed along with the image as an overlay on top of the image.

An annotation is entered at step 345 if a user wishes to have one printed on the image reverse. As with the custom message control item 1222, if no annotation is entered into control item 1310, the system automatically assumes none is desired and continues with the next step in the process. Similar to the step of entering the custom message, the annotation information is stored at step 347 on the server computer 6 when the user clicks the NEXT button on interface 1305. Similarly, values that have been selected at step 350 for image size and quantity for the selected image are also transmitted to the server computer 6 upon the user clicking NEXT from interface 1305. When interface 1305 is rendered, the selected image 78 and associated size, quantity, annotation, custom message are displayed so that the user may confirm that the specifications are correct for the ordered image. Upon clicking NEXT at step 380 on interface 1305, the user is presented with a standard dialog box for returning to interface 1205 to order more images, or to continue to interface 1405 to confirm the total order billing account information. As shown in the figure, if the user decides to continue to order more images 78, the system returns to step 310 and the process begins again. If the user decides that the order is complete at step 390, then at step 395 the interface 1405 is displayed. If the user confirms the order is complete by clicking FINISH, a standard dialog box known in the art is generated to provide the user one more opportunity to cancel an order. If the user then elects to process the order by clicking the appropriate control item in the dialog box, the order is complete and the system 15 begins to process the order at step 105.

Figure 13:
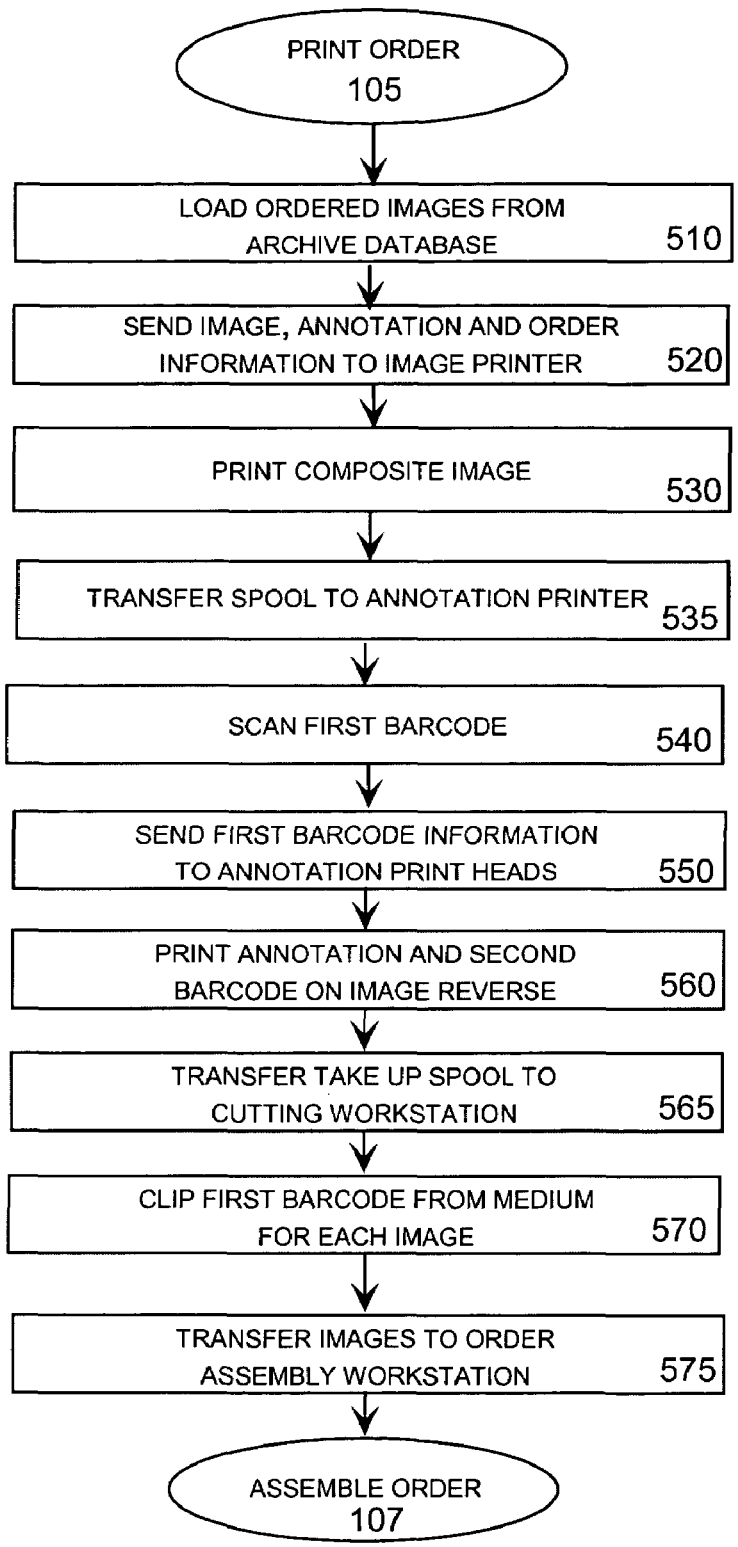
FIG. 13 is a flow diagram illustrating processing and printing for an online photograph ordering system.

FIG. 13 is a logic flow diagram illustrating the routine for printing the images. When the user elects to process the order, the process of printing the ordered images begins at step 105. At step 510, the ordered images are retrieved from the archive database 8 and loaded into a cache in the computer server 6 shown in FIG. 1. As each image 78 is loaded, the associated annotation, overlay and process control information are merged into a composite image file 80 and sent to the annotation printer controller 75 shown in FIG. 2 at step 520. This assumes that server 6 is located proximate to the printing apparatuses 1 an 10 and interfaces directly therewith. However, the server 6 may be at a different physical location than the printshop that houses the printers 1 and 10. In addition, the printer 10 and printer 1 may not be at the same physical locations. Thus, the Internet may be preferably used to transfer the composite image file 80 from the server 6 to the printer 10. But, it will be appreciated that the preferred embodiment has the server 6, printer 10 and printer 1 all located physically proximate to one another and connected to one another via a local network.

The first image file to be printed is printed by the image printer 10 at step 530. The printer 10 exposes the paper from the supply spool 19 to a composite image 82 formed from the digital image file 80. The composite image 82 is formed such that the barcode image 50 is projected onto the region immediately preceding the corresponding digital image 55 as the roll travels through printer 10. Printer 10 also preferably uses an inkjet printhead to print cut marks on the image reverse, and a puncher then places holes at the punch marks for later sensing by a commercially available cutter. All composite images 82 for a given order are printed, as well as subsequent orders from the same or other customers, until the supply roll 19 of paper has been exhausted. Then, the take-up spool 18 is transferred to the annotation printer 1 at step 535.

When spool 18 has been transferred and loaded into the annotation printer 1, scanner 14 reads each barcode 50 at step 540 as the medium advances through the printer. The information read from the first barcode 50 is then transmitted at step 550 to print-heads 16 and 20. If barcode 50 does not contain annotation information, controller 75 queries server computer 6 for any annotation information that is associated with the image number read from the first barcode. The server 6 transmits the annotation information to the printhead 16 for printing on the image reverse. Following the transmittal at step 550 of the information contained in the first barcode 50, the annotation 57 and second barcode 59 are printed at step 560.

After composite images 82 have been printed on the front side of the paper, and the annotations 57, barcodes 59 and cut-marks 60 have been printed on the image reverse 58, the medium 79 on take up spool 13 is transported to a cutter workstation 21 at step 565. Then, each section 53 containing a first barcode 50 is severed at the cutmarks 60 from the medium 79 at step 570, thereby leaving cropped images ready to be assembled into an order. The cutting process is preferably performed by a commercially available cutter that senses holes 61. However, human personnel may also be used to cut the images at the appropriate cutmarks 60 or holes 61. The cropped images are transported to an order assembly workstation 27 at step 575, and then assembled into complete orders at step 107.

In view of the foregoing, it will be appreciated that the invention provides an advantageous annotated digital photograph processing system using a composite image. It should be understood that the foregoing relates only to the illustrated embodiments of the invention, and that numerous changes may be made therein without departing from the spirit and scope of the invention as defined by the following claims.

The invention claimed is:

1. A method for processing and printing electronic images on a medium comprising the steps of:
    a) receiving an electronic image file;
    b) associating identification information with the electronic image file;
    c) generating a composite image file, wherein the composite image file includes the electronic image file and the identification information;
    d) printing the composite image from the composite image file on a first surface of a medium, the composite image including an image and a first symbol, the first symbol including the identification information;
    e) extracting the identification information from the first symbol; and
    f) printing the identification information read from the first symbol on a second surface of the medium.

2. The method of claim 1 wherein the medium is a continuous roll of photographic paper.

3. The method of claim 1 wherein the identification information includes an order number and an image number.

4. The method of claim 3 wherein the identification information is used to retrieve annotation information, the annotation information then being printed on the medium.

5. The method of claim 1 wherein the identification information includes annotation information.

6. The method of claim 1 wherein the first symbol is an optically readable barcode.

7. The method of claim 1 wherein the printed identification information includes a second symbol.

8. The method of claim 1 wherein the step of printing the composite image includes exposing the medium and chemically developing the image.

9. The method of claim 8 wherein the step of printing the second symbol occurs after the medium has been chemically processed.

10. The method of claim 1 wherein the composite image is printed on a photosensitive surface of the medium and the identification information is printed on the image reverse.

11. The method of claim 1 wherein the first symbol is read with an optical scanner.

12. The method of claim 1 further comprising the step of assembling an order, wherein the step of assembling an order includes the steps of:
    separating the first symbol from the medium for the composite image;
    separating the image from the medium;
    collecting one or more images having associated identification information; and
    shipping the collected images to an address associated with the customer number.

13. A method for processing and printing electronic images on a medium comprising the steps of;
    a) receiving an electronic image file;
    b) associating identification information with the electronic image file;
    c) generating a composite image file, wherein the composite image file includes the electronic image file and the identification information;
    d) printing the composite image from the composite image file on a first surface of a medium, the composite image including an image and a first symbol, the first symbol including the identification information;
    e) extracting the identification information from the first symbol by reading the first symbol from the first surface of the medium;
    f) printing the identification information read from the first symbol on a second surface of the medium; and
    g) separating the first symbol from the medium for the composite image.

14. The method of claim 13 wherein the medium is a continuous roll of photographic paper.

15. The method of claim 13 wherein the identification information includes an order number and an image number.

16. The method of claim 15 wherein the identification information is used to retrieve annotation information, the annotation then being printed on the medium.

17. The method of claim 13 wherein the identification information includes annotation information.

18. The method of claim 13 wherein the first symbol is an optically readable barcode.

19. The method of claim 13 wherein the printed identification information includes a second symbol.

20. The method of claim 13 wherein the step of printing the composite image includes exposing the medium and chemically developing the image.

21. The method of claim 13 wherein the step of printing the second symbol occurs after the medium has been chemically processed.

22. The method of claim 13 wherein the composite image is printed on a photosensitive surface of the medium and the identification information is printed on the image reverse.

23. The method of claim 13 wherein the first symbol is read with an optical scanner.

24. The method of claim 13 further comprising the step of assembling an order, wherein the step of assembling an order includes the steps of:
   collecting one or more images having associated identification information; and
   shipping the collected images to an address associated with the customer number.

25. An annotation printer apparatus for processing images on a medium and printing information thereon comprising:
   a) means for reading a plurality of first symbols existing on a first surface of the medium, wherein each of the first symbols corresponds to one of a plurality of images existing on the medium, the first symbol including identification information;
   b) means for printing identification information read from each of the first symbols on a second surface of the medium, wherein the identification information read from each of the first symbols is printed on the reverse side of the image and first symbol to which it corresponds; and
   c) means for regulating movement of the medium through the apparatus to coordinate the reading of each first symbol and the printing of the identification information.

26. The apparatus of claim 25 wherein the medium is a continuous roll of photographic paper.

27. The apparatus of claim 25 wherein the identification information includes an order number and a customer number.

28. The apparatus of claim 25 wherein the identification information includes annotation information.

29. The apparatus of claim 25 wherein each first symbol is an optically readable barcode.

30. The apparatus of claim 25 wherein the printed identification information includes a second symbol.

31. The apparatus of claim 25 wherein the means for reading the plurality of first barcodes is an optical scanner.

32. The apparatus of claim 25 wherein the means for printing the information is an ink jet print-head.

33. The apparatus of claim 25 wherein the means for regulating the movement of the medium through the apparatus includes a computer, wherein the computer is connected to sensors for sensing the speed the medium moves through the apparatus, for determining when the printing means prints the information so that the information is printed proximate to the corresponding image.

34. The apparatus of claim 33 wherein the means for regulating the movement of the medium through the apparatus further comprises:
   an electric motor with an attached drive pulley, the speed of which is regulated by the computer based on the sensed speed of the medium, for motivating the medium; and
   a drive system including a plurality of pulleys, wherein a separate pulley is attached to the motor, a supply spool, a take-up spool, and two capstans, the pulleys driven by a plurality of belts attached to the drive pulley of the motor.

35. The apparatus of claim 33 wherein the computer is adapted to communicate with a server computer via a network, for retrieving an annotation associated with the identification information read from the first bar code, the computer further adapted to cause the printing means to print the annotation on the medium proximate to the composite image to which is corresponds.

36. An annotation printer apparatus for processing images on a medium and printing information thereon comprising:
   a) means for reading a plurality of first symbols existing on a first surface of the medium, wherein each of the first symbols is on the same surface as, proximate to and corresponds to one of a plurality of images existing on the medium, wherein the means for reading is rigidly attached to a table;
   b) means for printing identification information on the medium, the means for printing being rigidly attached to the table, wherein the identification information is printed on the reverse of the image and first symbol to which it corresponds,
   c) means for regulating movement of the medium through the apparatus to coordinate the reading of each first symbol and the printing of each second symbol, wherein the means for regulating includes
      i) a computer, the being computer connected to sensors rigidly attached to the table, for sensing the speed the medium moves through the apparatus to determine when the printing means prints the information so that the information is printed proximate to the image to which it corresponds,
      ii) an electric motor having an output shaft, the speed of the output shaft being regulated by the computer based on the sensed speed of the medium, for motivating the medium, and
      iii) a drive system means adapted to transfer rotational motion of the output shaft to a supply spool, a take-up spool, and two capstans simultaneously; and
   wherein the computer is configured to communicate with a server computer to receive identification information therefrom, the identification information corresponding to information read from each of the first symbols.

37. The apparatus of claim 36 wherein the medium is a continuous roll of photographic paper.

38. The apparatus of claim 36 wherein the information includes an order number and a customer number.

39. The apparatus of claim 36 wherein the information includes annotation information.

40. The apparatus of claim 36 wherein each first symbol is an optically readable barcode.

41. The apparatus of claim 36 wherein the information includes a second symbol.

42. The apparatus of claim 36 wherein the means for reading the plurality of first barcodes is an optical scanner.

43. The apparatus of claim 36 wherein the means for printing the identification information is an ink jet print-head.

44. A photo-shop for processing and printing digital images comprising:
   a) a computer server for generating a user interface, receiving digital images and corresponding information, creating and maintaining customer accounts, authenticating users and generating and sending a composite image to a printer for printing photographic images;

b) a photographic printer for printing photographic composite images on a first surface of a medium, each of the composite images including an image portion and a first symbol;

c) an annotation printer apparatus including
   i) means for reading a first symbol existing on the first surface of the medium, wherein the first symbol corresponds to one of a plurality of images existing on the medium, wherein the means for reading is rigidly attached to a table;
   ii) means for printing identification information on a second surface of the medium the medium, the means for printing being rigidly attached to the table, wherein the identification information is printed on the reverse of the image and first symbol to which it corresponds;
   iii) means for regulating movement of the medium through the apparatus to coordinate the reading of each first symbol and the printing of identification information, wherein the means for regulating movement includes;
      aa) a computer, the computer being connected to sensors rigidly attached to the table, for sensing the speed the medium moves through the apparatus to determine when the printing means prints the information so that the information is printed proximate to the image to which it corresponds,
      bb) an electric motor having an output shall, the speed of the output shaft being regulated by the computer based on the sensed speed of the medium, for motivating the medium, and
      cc) a drive system means adapted to transfer rotational motion of the output shaft to a supply spool, a take-up spool, and two capstans simultaneously;
   wherein the computer is configured to communicate with a server computer to receive identification information therefrom, the identification information corresponding to information read from each of the first symbols;

d) a cutter workstation for cutting the medium to separate each first symbol from its corresponding image; and e) an order assembly workstation for assembling all cut images corresponding to a particular order number.

* * * * *